US 11,899,428 B2

(12) United States Patent
Nagasaki

(10) Patent No.: US 11,899,428 B2
(45) Date of Patent: Feb. 13, 2024

(54) WORK RESUME SYSTEM, MANUFACTURING METHOD, AND PROGRAM

(71) Applicant: Kabushiki Kaisha Yaskawa Denki, Kitakyushu (JP)

(72) Inventor: Takashi Nagasaki, Kitakyushu (JP)

(73) Assignee: Kabushiki Kaisha Yaskawa Denki, Kitakyushu (JP)

(*) Notice: Subject to any disclaimer, the term of this patent is extended or adjusted under 35 U.S.C. 154(b) by 40 days.

(21) Appl. No.: 17/211,886

(22) Filed: Mar. 25, 2021

(65) Prior Publication Data
US 2021/0302940 A1 Sep. 30, 2021

(30) Foreign Application Priority Data
Mar. 31, 2020 (JP) .................................. 2020-064646

(51) Int. Cl.
*G05B 19/4155* (2006.01)
*B21C 51/00* (2006.01)

(52) U.S. Cl.
CPC .......... *G05B 19/4155* (2013.01); *B21C 51/00* (2013.01); *G05B 2219/34365* (2013.01); *G05B 2219/50391* (2013.01)

(58) Field of Classification Search
None
See application file for complete search history.

(56) References Cited

U.S. PATENT DOCUMENTS

| 2001/0004718 A1* | 6/2001 | Gilliland | B25J 9/1671 700/262 |
| 2006/0276934 A1* | 12/2006 | Nihei | B25J 9/1679 700/245 |
| 2008/0103625 A1* | 5/2008 | Mochida | G05B 19/4067 700/174 |
| 2010/0115524 A1* | 5/2010 | Jang | B25J 9/1602 718/103 |
| 2015/0112481 A1* | 4/2015 | Burns | B25J 9/1674 700/248 |

(Continued)

FOREIGN PATENT DOCUMENTS

| JP | H0588720 A * | 4/1993 |
| JP | 2007090493 A * | 4/2007 |

(Continued)

OTHER PUBLICATIONS

Japanese Office Action dated Feb. 22, 2022 in Japanese Patent Application No. 2020-064646 (with English translation), 7 pages.

(Continued)

*Primary Examiner* — Mohammad Ali
*Assistant Examiner* — David Earl Ogg
(74) *Attorney, Agent, or Firm* — Oblon, McClelland, Maier & Neustadt, L.L.P.

(57) ABSTRACT

A task resumption system including processing circuitry that receives a task resumption specification for task resumption by a device when the device, which sequentially performs multiple tasks, stops during processing, acquires a current state of the device, acquires a resume state corresponding to the task resumption of the device, causes the device to transition from the current state to the resume state, and causes the device to resume the task according to the resume state.

20 Claims, 14 Drawing Sheets

(56) References Cited

U.S. PATENT DOCUMENTS

| | | | |
|---|---|---|---|
| 2016/0144506 A1 | 5/2016 | Natsume et al. | |
| 2017/0334071 A1* | 11/2017 | Zhang | B25J 9/1689 |
| 2018/0281190 A1* | 10/2018 | Kakisaka | B25J 9/1661 |
| 2019/0275676 A1* | 9/2019 | Jensen | B25J 13/006 |
| 2020/0298408 A1* | 9/2020 | Hashimoto | B25J 9/1682 |

FOREIGN PATENT DOCUMENTS

| | | | |
|---|---|---|---|
| JP | 2015-205382 A | 11/2015 | |
| JP | 6432883 B2 | 12/2018 | |

OTHER PUBLICATIONS

Notice of Reasons for Refusal dated Jul. 5, 2022 in Japanese Patent Application No. 2020-064646 (with English machine translation), 7 pages.

* cited by examiner

FIG. 4

```
#version= 2.0
# COMMENT
# Tube1  Initial arrangement information 1
# Tube2  Initial arrangement information 2
# START,WHOLE
COM  Condition A  Initial state reflection flag 0  Job conversion flag 1  Centrifuge Tube 1
COM  Condition B  Initial state reflection flag 0  Job conversion flag 1  Add  Tube 2
COM  Condition C  Initial state reflection flag 0  Job conversion flag 1  Mix  Tube 2
COM  Condition D  Initial state reflection flag 0  Job conversion flag 1  Discard  Tube 2
COM  Condition E  Initial state reflection flag 0  Job conversion flag 1  Centrifuge  Tube 1
# END
```

FIG. 6
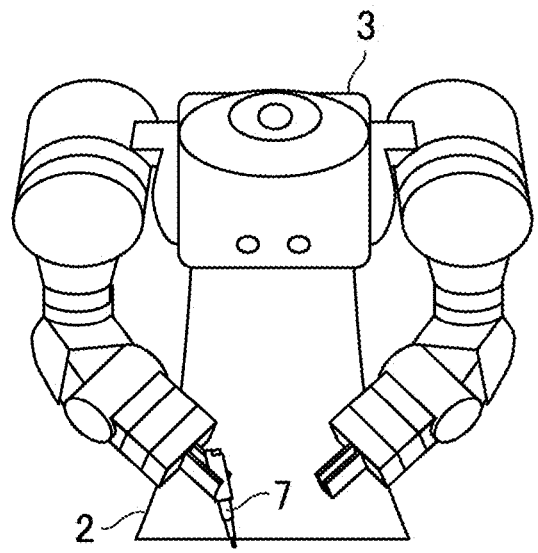
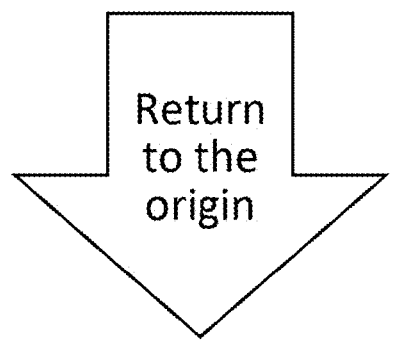
Return to the origin
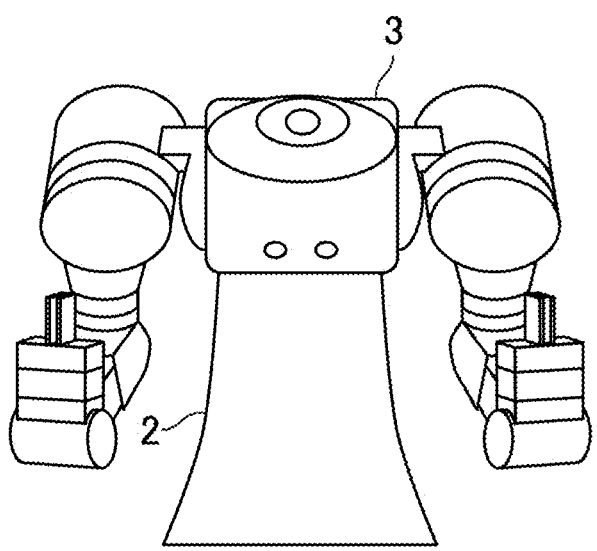

FIG. 9

```
#version= 2.0
# COMMENT
# Tube1  Initial arrangement information 1
# Tube2  Initial arrangement information 2
# START,WHOLE
COM  Condition A  Initial state reflection flag 1  Job conversion flag 0  Centrifuge Tube 1
COM  Condition B  Initial state reflection flag 1  Job conversion flag 0  Add  Tube 2
COM  Condition C  Initial state reflection flag 0  Job conversion flag 1  Mix  Tube 2
COM  Condition D  Initial state reflection flag 0  Job conversion flag 1  Discard  Tube 2
COM  Condition E  Initial state reflection flag 0  Job conversion flag 1  Centrifuge  Tube 1
# END
```

WORK RESUME SYSTEM, MANUFACTURING METHOD, AND PROGRAM

CROSS-REFERENCE TO RELATED APPLICATIONS

The present application is based upon and claims the benefit of priority to Japanese Patent Application No. 2020-064646, filed Mar. 31, 2020, the entire contents of which are incorporated herein by reference.

BACKGROUND OF THE INVENTION

Field of the Invention

The present invention relates to a work resume system, a manufacturing method, and a program.

DESCRIPTION OF BACKGROUND ART

Japanese Patent No. 6432883 describes a system that causes a robot to operate by generating a command based on a protocol chart in which multiple works are sequentially described. In such a system, when some failure occurs and the robot stops during processing, a user restores from the failure and returns the stopped robot to an initial state. After that, when the user instructs to resume, the robot resumes from a first work described in the protocol chart. The entire contents of this publication are incorporated herein by reference.

SUMMARY OF THE INVENTION

According to one aspect of the present invention, a task resumption system including processing circuitry that receives a task resumption specification for task resumption by a device when the device, which sequentially performs multiple tasks, stops during processing, acquires a current state of the device, acquires a resume state corresponding to the task resumption of the device, causes the device to transition from the current state to the resume state, and causes the device to resume the task according to the resume state.

According to another aspect of the present invention, a method for work resumption includes receiving a task resumption specification by a device when the device, which sequentially performs multiple tasks, stops during processing, acquiring a current state of the device, acquiring a resume state corresponding to a task resumption of the device, causing the device to transition from the current state to the resume state, and causing the device to resume the task according to the resume state.

According to yet another aspect of the present invention, a non-transitory computer readable medium having stored thereon a program that when executed by a computer causes the computer to implement a method for work resumption, that includes receiving a task resumption specification for task resumption by a device when the device, which sequentially performs multiple tasks, stops during processing, acquiring a current state of the device, acquiring a resume state corresponding to the task resumption of the device, causing the device to transition from the current state to the resume state, and causing the device to resume the task according to the resume state.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 4 illustrates an example of sequence data;

FIG. 6 illustrates how the robot returns to an origin;

FIG. 9 illustrates an example of sequence data when a continuation protocol is generated;

DETAILED DESCRIPTION OF THE EMBODIMENTS

Figure 1:
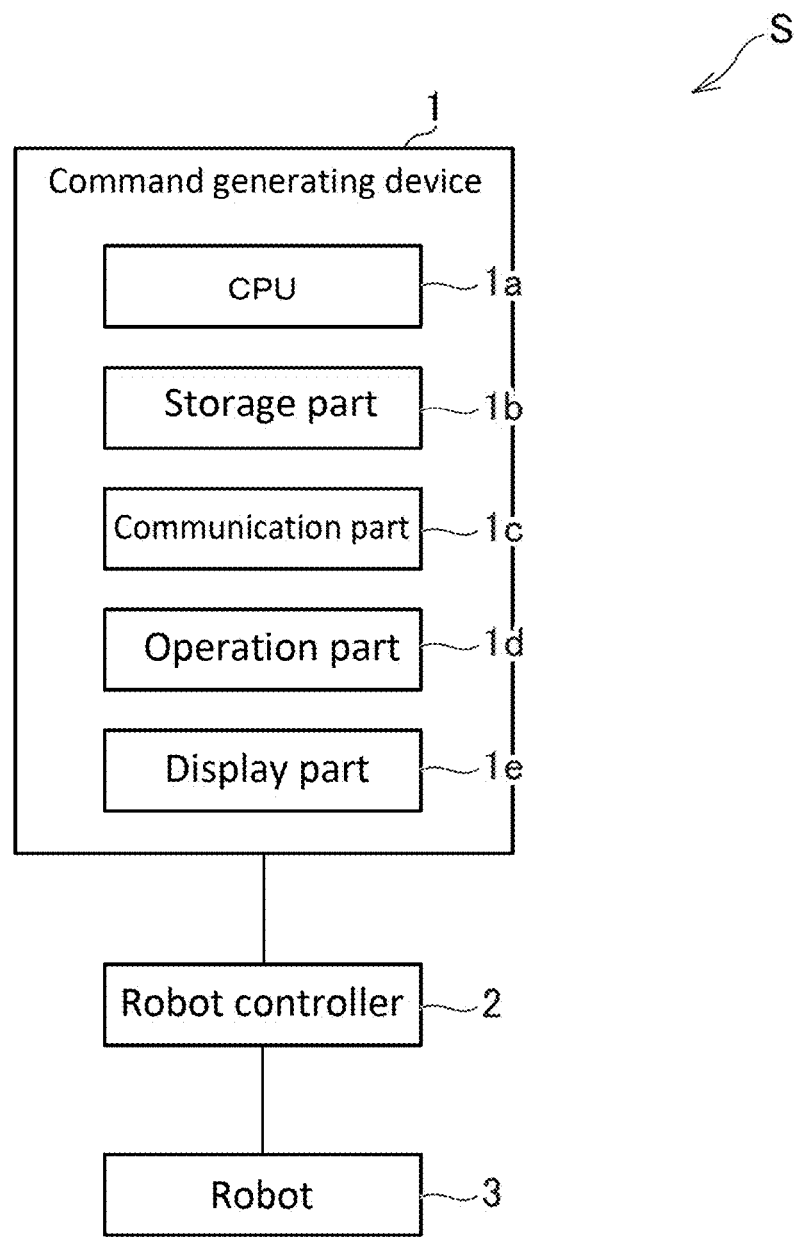
FIG. 1 illustrates an example of an overall structure of a robot system.

Embodiments will now be described with reference to the accompanying drawings, wherein like reference numerals designate corresponding or identical elements throughout the various drawings.

1. OVERALL STRUCTURE OF WORK RESUME SYSTEM

A robot system described below is an example of a work resume system to be applied to controlling a robot. Therefore, in an embodiment, a part described as a robot system can be read as a work resume system. The work resume system can be applied to any situation without being limited to controlling a robot. For example, the work resume system may be applied to a situation of resuming a work of another industrial device such as a motor controller, an inverter, or a PLC (Programmable Logic Controller).

FIG. 1 illustrates an example of an overall structure of a robot system (S). As illustrated in FIG. 1, the robot system (S) includes a command generating device 1, a robot controller 2, and a robot 3. The command generating device 1 and the robot controller 2 are communicably connected to each other by a network. The network may be of any type, for example, an industrial network, a LAN, or the Internet. The robot controller 2 and the robot 3 are connected by power lines, signal lines, and the like. FIG. 1 illustrates one command generating device 1, one robot controller 2, and one robot 3. However, there may be multiple command generating devices 1, multiple robot controllers 2, and multiple robots 3.

The command generating device 1 is a computer operated by a user. For example, the command generating device 1 is a personal computer, a server computer, a mobile terminal (including a tablet terminal or a wearable terminal), or a mobile phone (including a smartphone). As illustrated in FIG. 1, the command generating device 1 includes a CPU (1a), a storage part (1b), a communication part (1c), an operation part (1d), and a display part (1e).

The CPU (1a) includes at least one processor. The storage part (1b) includes a RAM or a hard disk. The storage part (1b) stores programs and data. The CPU (1a) executes processing based on the programs and data. The communication part (1c) includes communication interfaces such as network cards and various communication connectors. The communication part (1c) communicates with other devices. The operation part (1d) is an input device including a mouse, a keyboard, or the like. The display part (1e) is a liquid crystal display, an organic EL display, or the like.

The robot controller 2 is a computer that controls the robot 3. For example, the robot controller 2 includes a CPU, a storage part, a communication part, and the like, and controls the robot 3 based on a command received from the command generating device 1. The robot 3 may be of any form, for example, a vertical articulated type, a horizontal articulated type, or a gantry type. For example, the robot 3 includes motors and sensors. A sensor may be of any type, for example, a motor encoder, a grip sensor, a motion sensor, a gyro sensor, or a vision sensor. These sensors may be connected to the robot controller 2 instead of being included in the robot 3.

The programs and data described as being stored in the command generating device 1 may be supplied over the network. Further, a hardware structure of the command generating device 1 is not limited to the example described above, and various hardware structures can be applied. For example, a reading part (for example, an optical disk drive or a memory card slot) that reads a computer-readable information storage medium, or an input-output part (for example, a USB terminal) for directly connecting to an external device may be included. In this case, programs and data stored in the information storage medium may be supplied via the reading unit or the input-output part.

2. OVERVIEW OF ROBOT SYSTEM

In the present embodiment, processing of the robot system (S) is described by taking as an example a situation where an experiment in life science or processing on a sample is performed. A situation where the robot system (S) is applied is not limited to the example of the present embodiment. The robot system (S) can be applied to any other situation such as food manufacturing or assembling of parts. For example, the robot controller 2 and the robot 3 have properties of being general-purpose machines that can flexibly handle various experiments and processes. The robot controller 2 controls the robot 3 such that a procedure performed by an expert can be reproduced with high accuracy.

Figure 2:
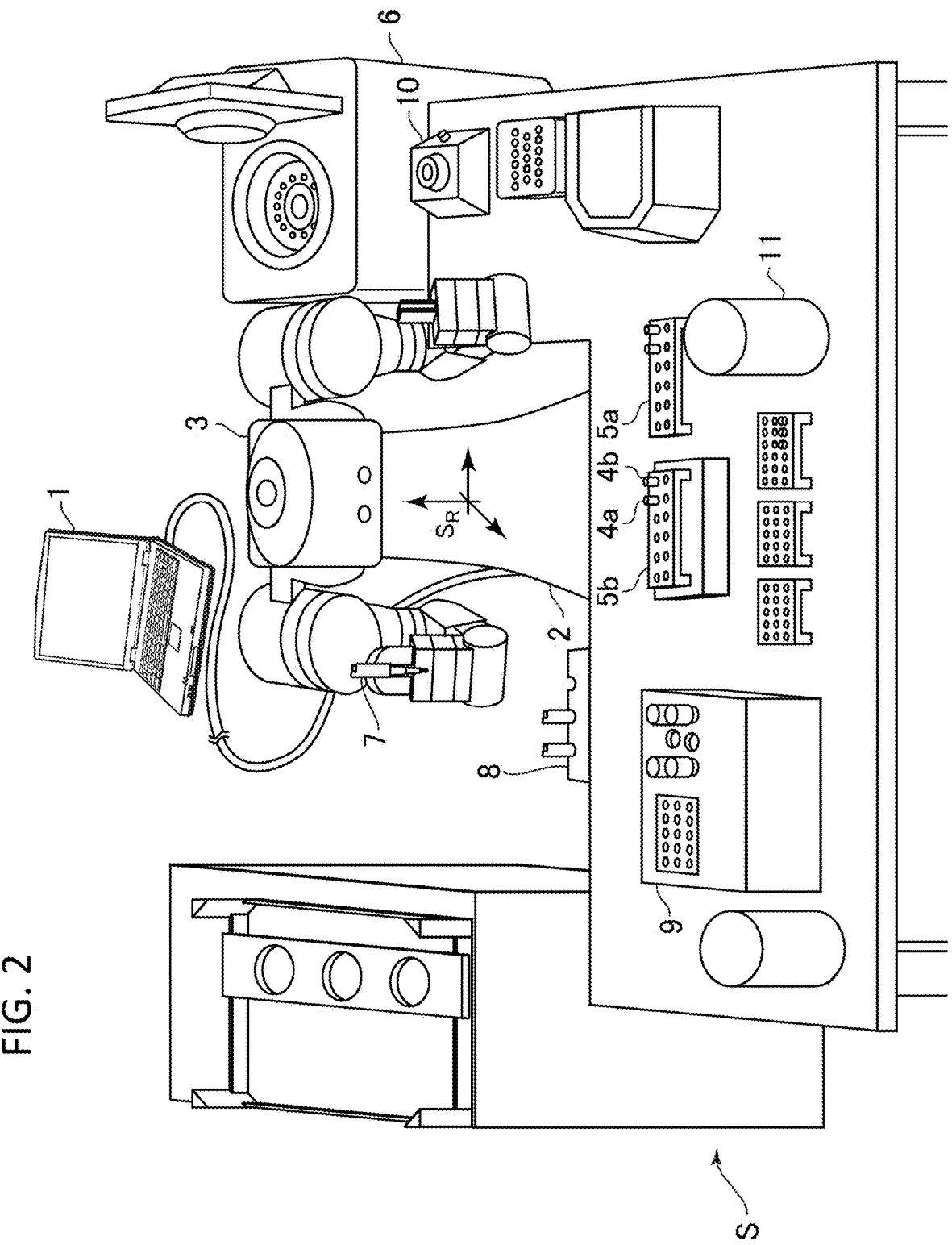
FIG. 2 illustrates an example of how a robot operates.

FIG. 2 illustrates an example of how the robot 3 operates. As illustrated in FIG. 2, the robot 3 uses two arms to perform processing with respect to a processing target or a container containing the processing target. The processing target is a material as a target of processing in an experiment or examination, for example, a biological tissue or bacteria. For example, the container is a microtube, a Petri dish, or a microplate.

In the present embodiment, the robot 3 performs each of a first work group with respect to a first microtube (4a) in which a first processing target is stored and a second work group with respect to a second microtube (4b) in which a second processing target is stored. The first processing target and the second processing target may be of the same type or different types. The first microtube (4a) is pre-stored by a user at a first position in a tube rack (5a). The second microtube (4b) is pre-stored by the user at a second position of the tube rack (5a).

The first work group is a series of works for processing the first microtube (4a) using a centrifugal separator 6. For example, the robot 3 moves the first microtube (4a) from the tube rack (5a) to a main rack (5b). After that, the robot 3 moves the first microtube (4a) from the main rack (5b) to the centrifugal separator 6 and arranges the first microtube (4a) in the centrifugal separator 6. The centrifugal separator 6 processes the first microtube (4a) for a predetermined time. When the predetermined time has elapsed, the robot 3 moves the first microtube (4a) from the centrifugal separator 6 to the main rack (5b). As a result, the first work group is completed.

The second work group is a series of works for using a pipette 7 to inject a liquid agent arranged in a thermostatic bath 9 into the second microtube (4b) to mix the liquid agent in the second microtube (4b). For example, the robot 3 moves the second microtube (4b) from the tube rack (5a) to the main rack (5b). The robot 3 grips a pipette 7 stored at a predetermined position in a pipette rack 8 and sucks a liquid agent arranged in the thermostatic bath 9 with the pipette 7. The robot 3 injects the liquid agent into the second microtube (4b) arranged in the main rack (5b) and moves the second microtube (4b) to a vortex mixer 10. The vortex mixer 10 processes the second microtube (4b) for a predetermined time. When the predetermined time has elapsed, the robot 3 discards the pipette 7 to a dust box 11. The robot 3 moves the second microtube (4b) to the main rack (5b). As a result, the second work group is completed.

In the present embodiment, the command generating device 1 generates a command for the robot controller 2 to control the robot 3 based on a protocol chart in which the first work group and the second work group are described. The protocol chart is a chart described such that a person can recognize a protocol. A protocol is information in which processes of an experiment or processing and conditions for executing the processes are described. In a broad sense, a protocol includes not only processing performed by a device, but also a manual work by a human. The protocol chart is described in a predetermined format. For example, the protocol chart describes contents of processing with respect to a processing target or a container containing the processing target.

In the protocol chart, at least one processing symbol that visually expresses an individual process is described. Arrangement of processing symbols specifies processing processes. For the protocol chart itself, a known chart can be used. For example, a chart described in the prior art document or in Japanese Patent Application Laid-Open Publication No. 2018-167361 can be used. In the present embodiment, a program (hereinafter referred to as a "protocol maker") for generating a protocol is stored in the command generating device 1. For example, when the protocol maker starts, contents of a protocol chart are displayed in the display part (1e).

Figure 3:
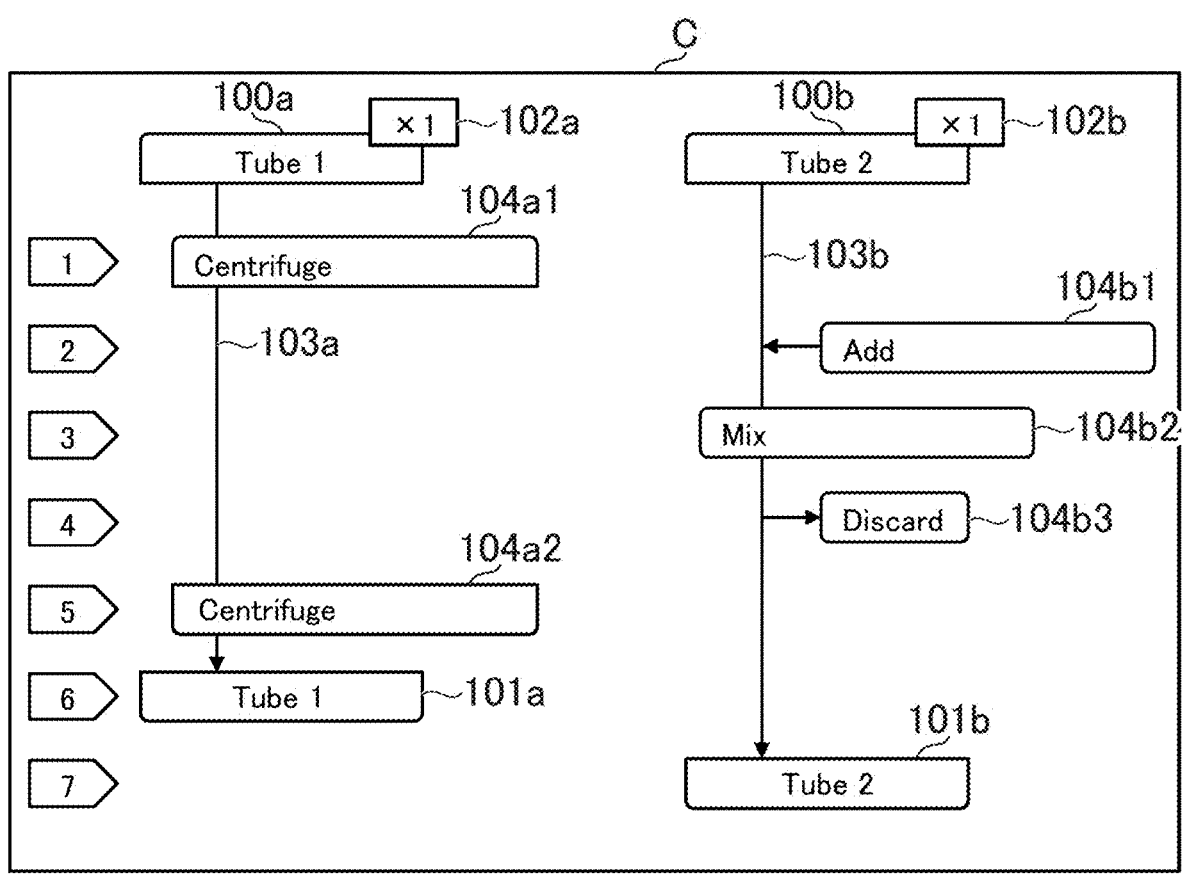
FIG. 3 illustrates an example of a protocol chart.

FIG. 3 illustrates an example of a protocol chart. As illustrated in FIG. 3, in a protocol chart (C), a protocol is described for each container that contains a processing target. In the present embodiment, processing is performed with respect to two containers, the first microtube (4a) and the second microtube (4b), and thus, two protocol groups are described. For example, on a left side of the protocol chart (C), a protocol group corresponding to the first work group is described. Further, for example, on a right side of the protocol chart (C), a protocol group corresponding to the second work group is described.

For example, on the left side of the protocol chart (C), an initial symbol (100a) and a final symbol (101a) corresponding to the first microtube (4a) are arranged. The initial symbol (100a) and the final symbol (101a) are information identifying a container as target of work, and include, for example, a character string "Tube 1" which is a name of the first microtube (4a). The initial symbol (100a) and the final symbol (101a) may include information about a position where the first microtube (4a) is arranged, a stored processing target, and the like.

The initial symbol (100a) includes a container number symbol (102a) indicating the number of containers to be prepared. When there are multiple first microtubes (4a) with respect to which the same work is performed, the container number symbol (102a) displays a numerical value indicating the number of the first microtubes (4a). The initial symbol (100a) and the final symbol (101a) are connected by a sequence line (103a). Between the initial symbol (100a) and the final symbol (101a), processing symbols (104a1, 104a2) indicating processing using the centrifugal separator 6 are described. The processing symbols (104a1, 104a2) are arranged in a chronological order of processing.

Further, for example, on the right side of the protocol chart (C), an initial symbol (100b) and a final symbol (101b) corresponding to the second microtube (4b) are arranged. Meanings of the initial symbol (100b), the final symbol (101b), a container number symbol (102b), and a sequence line (103b) are respectively the same as those for the first microtube (4a). Between the initial symbol (100b) and the final symbol (101b), a processing symbol (104b1) indicating a process of adding a liquid agent, a processing symbol (104b2) indicating a process of mixing the liquid agent, and a processing symbol (104b3) indicating a process of discarding a tool used in an experiment to the dust box 11 are described.

In the following description, when the initial symbols (100a, 100b), the final symbols (101a, 101b), the sequence lines (103a, 103b), and the processing symbols (104a1, 104a2, 104b1, 104b2, 104b3) are not respectively distinguished, they are respectively described as the initial symbols 100, the final symbols 101, the sequence lines 103, and the processing symbols 104.

Since the protocol chart (C) is visually expressed, it needs to be converted into commands to be input to the robot controller 2. The command generating device 1 generates commands according to the processes described in the protocol chart (C), and inputs the commands to the robot controller 2. As a method for generating commands, a known method can be used. In the present embodiment, a generation method described in Japanese Patent Application Laid-Open Publication No. 2018-167361 described above is described as an example. In the following, the method for generating commands is briefly described, and for details, the same publication may be referred. For example, the command generating device 1 generates sequence data showing an overall work flow based on the protocol chart (C).

FIG. 4 illustrates an example of sequence data. As illustrated in FIG. 4, sequence data (D) includes initial arrangement information of containers and information about individual protocols. The initial arrangement information is information indicating arrangement of the containers when work starts, and includes information about names, initial positions, states and capacities of the containers and the number of the containers. Information required to generate the initial arrangement information is described in the protocol chart (C). For example, the initial arrangement information is generated based on the description of the initial symbols 100.

Information about individual protocols includes conditions (for example, temperature and processing time of the centrifugal separator 6, injection amount of a liquid agent, and mixing time of the vortex mixer 10) for executing individual protocols, initial state reflection flags, job conversion flags, protocol names, and container names of processing targets. For example, the information about these is generated based on the description of the processing symbols 104.

An initial state reflection flag is a flag indicating whether or not to reflect an initial state. For example, "0" indicates that an initial state is not reflected, and "1" indicates that an initial state is reflected. A job conversion flag is a flag indicating whether or not to perform job conversion. For example, "0" indicates that job conversion is not performed, and "1" indicates that job conversion is performed. In the state of FIG. 4, since commands for executing all the protocols from the initial state are generated, the initial state reflection flags are all "0" and the job conversion flags are all "1." An initial state reflection flag and a job conversion flag may be combined into one flag.

The command generating device 1 generates unit jobs based on the sequence data (D). A unit job is a job that indicates a basic operation of the robot 3. For a unit job, a protocol having a job conversion flag of "1" is a generation target. For example, a unit job includes commands for performing multiple continuous operations. For example, a unit job of "grabbing a container" includes a series of commands such as "move," "grab," and "move." Also, for example, a unit job of "placing a container" includes a series of commands such as "move," "place," and "move." A unit job includes a start position and an end position.

The start position is a position of the robot 3 at the start of the unit job. The end position is a position of the robot 3 at the end of the unit job. The term "position" means positions of joints (positions of motors) of the robot 3. It is also possible to say that the term "position" means a posture of the robot 3. For example, in a case of a unit job of "grabbing a container," a position before grabbing the container (start position) and a position after grabbing the container (end position) are included in the unit job. Further, for example, in a case of a unit job of "placing a container," a position before placing the container (start position) and a position after placing the container (end position) are included in the unit job.

The command generating device 1 generates not only unit jobs but also connecting jobs. A connecting job is a job that indicates an operation of absorbing a difference in position of the robot 3 between unit jobs. In other words, a connecting job is a job that indicates an operation of moving the robot 3 from the end position of one unit job to the start position of the next unit job. Movements of the robot 3 may include postural changes. In a connecting job, it is possible that only a movement of the robot 3 is defined, or an operation other than a movement (for example, a change in posture only) is defined.

The command generating device 1 stores a command definition database (DB1) in which at least one unit job for each work command indicated by a protocol of the protocol chart (C) is defined. In the example of FIGS. 3 and 4, work commands are contents of protocols such as "Centrifuge" or "Add." The command generating device 1 refers to the command definition database (DB1) and acquires a set of unit jobs required for work commands. Based on the set of unit jobs, the command generating device 1 generates state information indicating a state in the robot system (S). For example, the command generating device 1 may calculate a state change of a container when a command having an initial state reflection flag of "1" is executed, and generate state information. The state information indicates a detailed state of the robot 3 itself and a detailed state around the robot 3. For example, the state information includes information necessary for knowing the state of the robot system (S), such as whether or not a lid of a container is closed, what and how much is in a container, where is a container stored, what is the posture of the robot 3, or what is gripped by the robot 3. The command generating device 1 stores a state information database (DB2) in which state information is stored in a chronological order.

Based on generated unit jobs and state information, the command generating device 1 generates connecting jobs. The connecting jobs are respectively generated between the unit jobs. Each of the connecting jobs is not simply a linear movement, but may select a route that does not interfere with other devices. The command generating device 1 connects the unit jobs and the connecting jobs in series, and generates robot operation commands for the robot controller 2.

A robot operation command is a command obtained by converting a protocol that is visibly understandable by human into a form that can be understood by the robot controller 2. The robot operation commands include commands for executing a series of flows described in the protocol chart (C) and parameters and the like required by the commands. For example, the robot operation commands may be generated by converting the unit jobs and the connecting jobs into a robot language or a ladder language. The robot controller 2 receives the robot operation commands from the command generating device 1 and controls the robot 3.

The robot controller 2 stops the robot 3 when a failure occurs during work. For example, the robot 3 stops when it interferes with other devices or drops a gripped object during operation. When the robot 3 stops, an alarm is generated in the command generating device 1. A user receives the alarm, confirms the state of the robot 3, and restores from the failure according to predetermined processes. Here, restoration processes when the robot 3 stops immediately after injecting a liquid agent at an "Add" protocol are described as an example.

Figure 5:
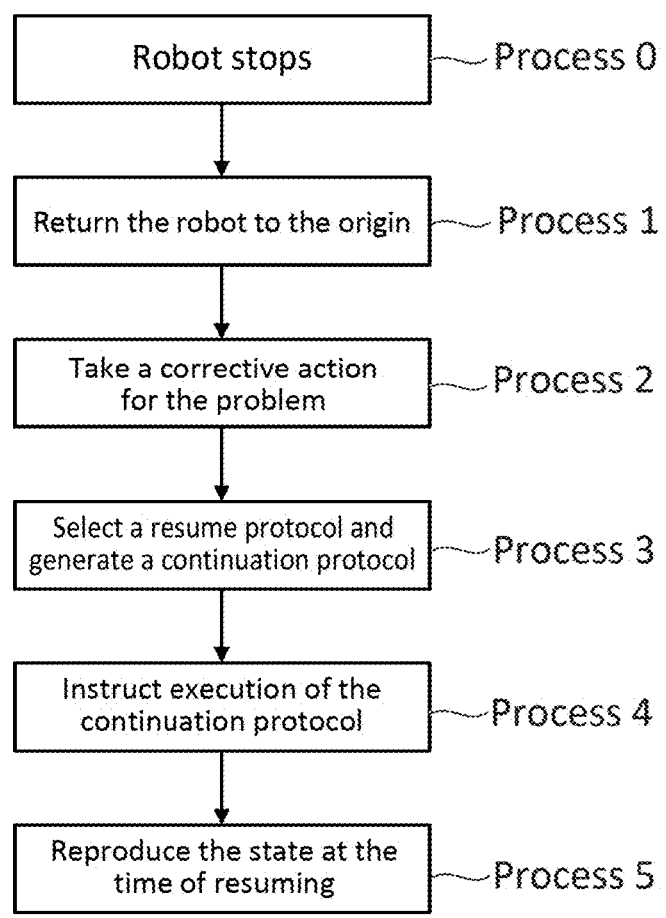
FIG. 5 illustrates an example of restoration processes.

FIG. 5 illustrates an example of the restoration processes. As illustrated in FIG. 5, when the robot 3 stops (process 0), a user operates the command generating device 1 to return the robot 3 to an origin (process 1). The origin is a basic posture of the robot 3. The basic posture may be any posture, for example, a posture in which the robot 3 faces front and puts arms in predetermined postures without gripping anything.

FIG. 6 illustrates how the robot 3 returns to the origin. As illustrated in FIG. 6, when the robot 3 stops in a posture in which the robot 3 grips a pipette 7 and injects a liquid agent, the user removes the pipette 7 from the robot 3. In a case where the robot 3 stops immediately after the injection of the liquid agent is completed, since the pipette 7 will not be used in a subsequent work, the user may discard the pipette 7 or a front end part of the pipette 7 in the dust box 11.

The user puts the robot 3 in a state of not gripping anything, and then performs an operation for returning the robot 3 to the origin with respect to the command generating device 1. Upon receiving this operation, the command generating device 1 transmits to the robot controller 2 a robot operation command of returning to the origin. Upon receiving the robot operation command, the robot controller 2 controls the robot 3 to take a predetermined posture. As a result, the return to the origin of the robot 3 is completed.

Returning to FIG. 5, the user takes a corrective action for the problem that caused the robot 3 to stop (process 2). For example, when the robot 3 stops because it interferes with an object, the user removes the object. Further, for example, when the robot 3 stops because an object gripped by the robot 3 drops, the user picks up the object and returns it to a predetermined position. The corrective action for the problem is not limited to these, and may be any corrective action for restoring from a failure.

When the corrective action for the problem is completed, the user selects a processing symbol 104 of a resume protocol to resume from the middle, and the command generating device 1 generates a continuation protocol to resume from a work indicated by the processing symbol 104 (process 3). The continuation protocols include all protocols from the resume protocol to a last protocol. In the process 3, the user operates the command generating device 1 to start the protocol maker and confirm an appropriate protocol.

Figure 7:
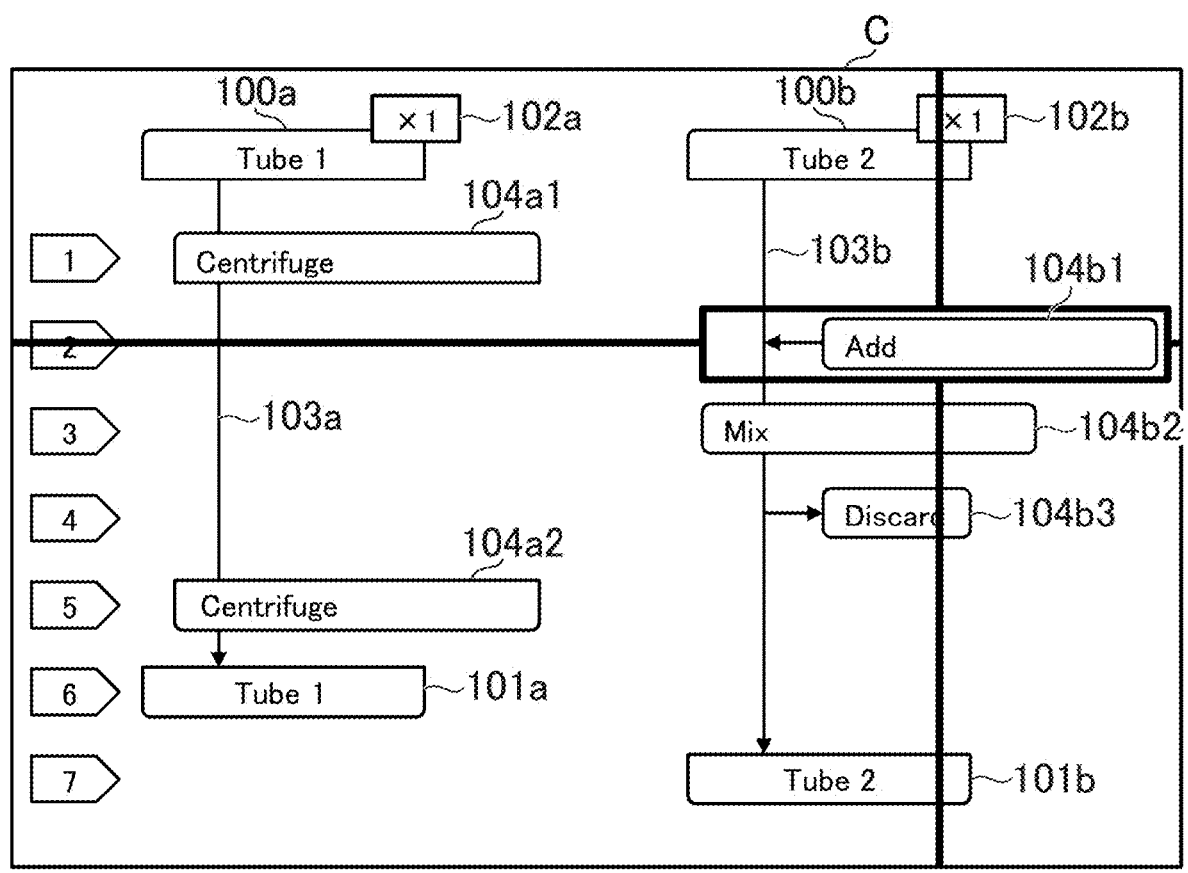
FIG. 7 illustrates how protocols are displayed on a screen of a protocol maker.

FIG. 7 illustrates how protocols are displayed on a screen of the protocol maker. As illustrated in FIG. 7, on the screen of the protocol maker, a protocol when the robot 3 stopped is highlighted in the protocol chart (C). Here, since the robot 3 stopped at the "Add" protocol, the processing symbol (104b1) is highlighted. The user specifies from a reproduction screen (G) the processing symbol 104 of the protocol to resume with. The user can specify any protocol. For example, the user may specify the protocol when the robot 3 stopped, or may specify a protocol before or after the protocol when the robot 3 stopped.

Figure 8:
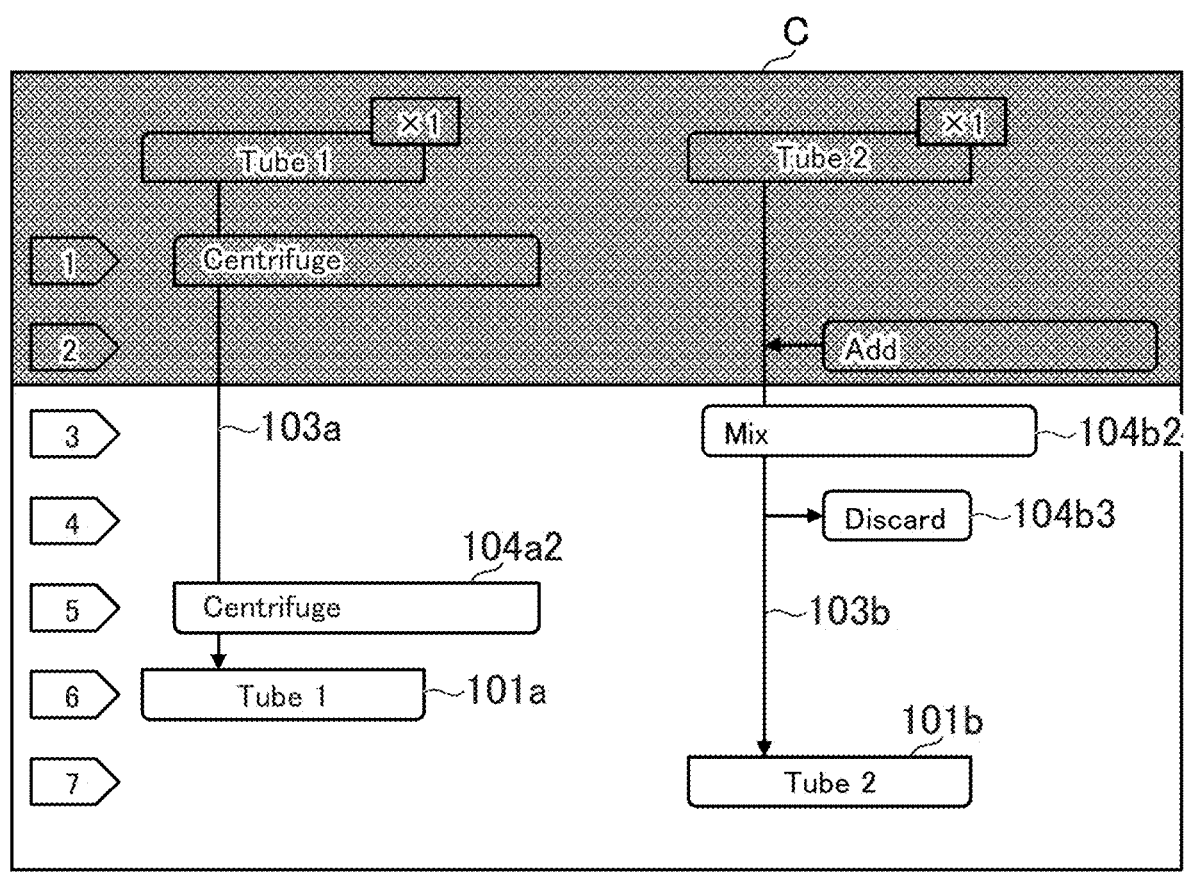
FIG. 8 illustrates an example of a screen when a protocol to resume with has been specified.

FIG. 8 illustrates an example of a screen when the protocol to resume with has been specified. Here, the robot 3 has stopped operating when the "Add" protocol is substantially completed. Further, due to the corrective action by the user, it is not necessary to execute a remaining portion of the "Add" protocol. Therefore, it is assumed that the user has specified the processing symbol (104b2) of the "Mix" protocol. As illustrated in FIG. 8, when the user specifies the processing symbol (104b2), symbols before the processing symbol (104b2) are grayed out.

When the user performs a predetermined job generation operation in the state of FIG. 7, a dialog prompting the user to save a job using a different name is displayed. The job generation operation is an operation for generating a job corresponding to a continuation protocol. In the present embodiment, a job generated by the job generation operation is saved with a predetermined file name in the command generating device 1. This job is saved under a name different from that of an initially generated job. When the user operates according to the dialog, generation of a job of the continuation protocol is started. Processes of the generation of the job may be the same as that of an initially generated job.

FIG. 9 illustrates an example of the sequence data (D) when the continuation protocol is generated. As illustrated in FIG. 9, an overall structure of the sequence data (D) is the same as that in FIG. 4, but the values of the initial state reflection flags and the job conversion flags are different from those in FIG. 4. Here, since the initial "Centrifuge" protocol and "Add" protocol are not executed, their initial state reflection flags are "1" and their job conversion flag values are "0." The command generating device 1 calculates a state change of a container when a protocol having an initial state reflection flag of "1" is executed, and generates a unit job only for a protocol having a job conversion flag value of "1." A method for generating a connecting job is also as described above.

As described above, even in the continuation protocol, jobs generated by the job generation operation include unit jobs and connection jobs described above. However, since the user has returned robot 3 to the origin, the command generating device 1 needs to move the robot 3 from the origin position to an initial position corresponding to the resume protocol specified by the user. In the present embodiment, the command generating device 1 uses a connecting job to move the robot 3 from the origin position to the initial position of the work specified by the user so as to allow the robot 3 to smoothly resume from the work specified by the user.

Unit jobs up to the resume protocol (unit jobs of protocols having a job conversion flag of "0") are virtually executed (or the unit jobs are not generated) and are not executed by the robot controller 2. The command generating device 1 causes the robot controller 2 to execute from the connecting job for moving the robot 3, which has returned to the origin, to the start position of the unit job of the resume protocol. When the user instructs the command generating device 1 to execute the continuation protocol (process 4), the command generating device 1 displays a reproduction screen (G) indicating a state to be reproduced at the time of resuming.

Figure 10:
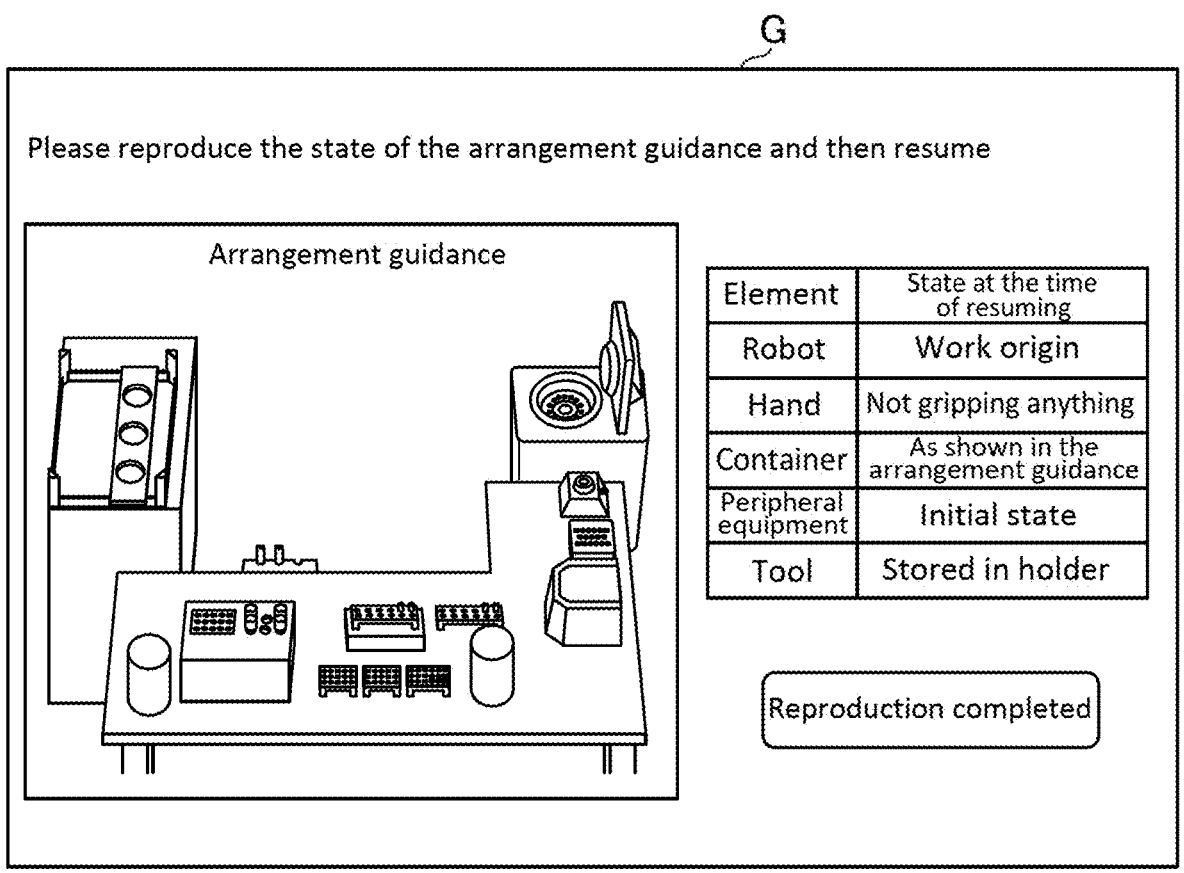
FIG. 10 illustrates an example of a reproduction screen.

FIG. 10 illustrates an example of the reproduction screen (G). As illustrated in FIG. 10, on the reproduction screen (G), a state of the robot 3 at the time of resuming, a state of a container, a state of peripheral equipment, and a state of a device gripped by the robot 3 are displayed. A guidance indicating an arrangement of devices may be displayed on the reproduction screen (G). Information shown on the reproduction screen (G) includes contents of state information immediately before the start of the resume protocol. When the user reproduces the state at the time of resuming according to the guidance on the reproduction screen (G) (process 5) and performs a predetermined operation, the robot 3 resumes operation.

As described above, when the robot 3 stops during processing, the command generating device 1 causes the user to specify any resume protocol. Since the robot 3 returns to the origin according to an operation of the user, the command generating device 1 generates a connecting job for moving the robot 3, which has returned to the origin, to a start position of a unit job of the resume protocol specified by the user. As a result, the robot 3 can smoothly resume from the resume protocol specified by the user. Details of the robot system (S) are described below.

3. FUNCTIONS REALIZED BY ROBOT SYSTEM

Figure 11:
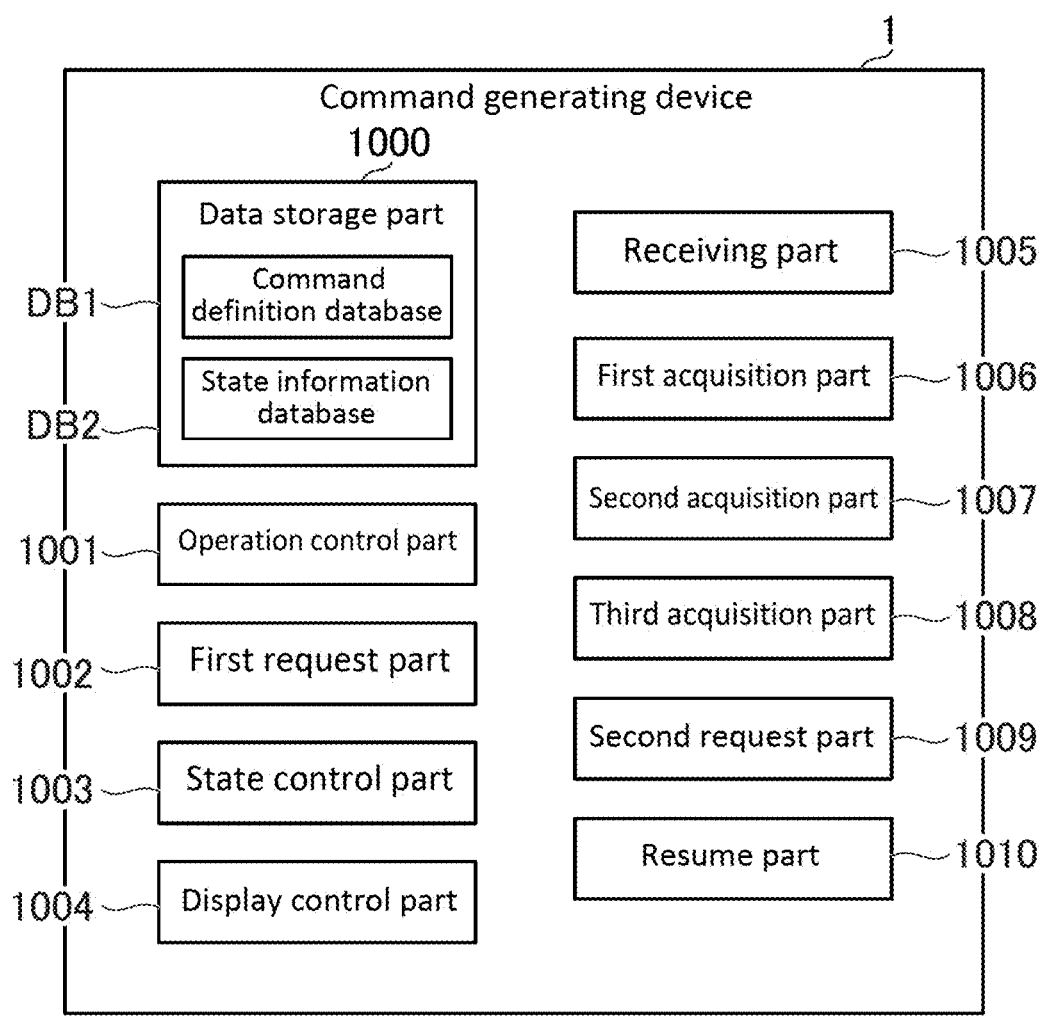
FIG. 11 is a functional block diagram illustrating functions realized by the robot system.

FIG. 11 is a functional block diagram illustrating functions realized by the robot system (S). In the present embodiment, a case is described where main functions are realized by the command generating device 1. As illustrated in FIG. 11, the command generating device 1 includes a data storage part 1000, an operation control part 1001, a first request part 1002, a state control part 1003, a display control part 1004, a receiving part 1005, a first acquisition part 1006, a second acquisition part 1007, a third acquisition part 1008, a second request part 1009, and a resume part 1010.

3-1. Data Storage Part

The data storage part 1000 is mainly realized by the storage part (1*b*). The data storage part 1000 stores data required for transmitting robot operation commands to the robot controller 2. For example, the data storage part 1000 stores the command definition database (DB1) and the state information database (DB2).

In the command definition database (DB1), the unit jobs corresponding to the protocols described in the protocol chart (C) are defined. For example, the protocol of the initial symbol 100 is associated with a unit job that includes commands "move onto the tube rack (5*a*)," "grab a container," "move onto the main rack (5*b*)," "place the container," and "move onto the main rack (5*b*)." The start position of this unit job is a position on the tube rack (5*a*). The end position of this unit job is a position on the main rack (5*b*).

In the protocol of the processing symbol 104, a unit job corresponding to a character string described in the protocol is defined. For example, the "Centrifuge" protocol is associated with a unit job that includes commands "move onto the main rack (5*b*)," "grab a container," "move onto the centrifugal separator 6," "place the container," "wait," "move onto the centrifugal separator 6," "grab the container," and "move onto the centrifugal separator 6." The start position of this unit job is a position on the main rack (5*b*). The end position of this unit job is a position on the centrifugal separator 6.

For example, for example, the "Add" protocol is associated with a unit job that includes commands "move onto the pipette rack 8," "grab a pipette 7," "move onto the thermostatic bath 9," "suck a liquid agent," "move onto the main rack (5*b*)," "inject the liquid agent," and "move onto the main rack (5*b*)." The start position of this unit job is a position on the pipette rack 8. The end position of this unit job is a position on the main rack (5*b*).

Further, for example, the "Mix" protocol is associated with a unit job that includes commands "move onto the main rack (5*b*)," "grab a container," "move onto the vortex mixer 10," "place the container," "wait," and "move onto vortex mixer 10." The start position of this unit job is a position on the main rack (5*b*). The end position of this unit job is a position on the vortex mixer 10.

Further, for example, the "Discard" protocol is associated with a unit job that includes commands "move onto the dust box 11," "release the object being gripped," and "move onto the dust box 11." The start position and the end position of this unit job are positions on the dust box 11.

Further, for example, the protocol of the final symbol 101 is associated with a unit job that includes commands "move onto the main rack (5*b*)," "place a container," and "move onto the main rack (5*b*)." The start position and the end position of this unit job are positions on the main rack (5*b*).

The state information database (DB2) contains state information at the time each unit job is executed and a state correspondence table. For example, the state information database (DB2) stores state information from an initial state to the end of work in a chronological order. The state correspondence table is a table in which meanings of values used in the state information are defined. For example, in the state correspondence table, meanings of a value indicating a state of a hand of the robot 3, a value indicating a state of the centrifugal separator 6, a value indicating a state of the pipette rack 8, a value indicating a state of the thermostatic bath 9, and a value indicating a state of the vortex mixer 10 are defined.

3-2. Operation Control Part

The operation control part 1001 is mainly realized by the CPU (1*a*). The operation control part 1001 transmits to the robot controller 2 the robot operation commands for operating the robot 3. The robot 3 is an example of a device that sequentially performs multiple works. Therefore, in the present embodiment, a part described as the robot 3 can be read as a device. This device may be any other industrial device as long as it performs a work on behalf of a person. A work can be referred to as a process or an operation. Gripping a container, moving a container, arranging a container, sucking a liquid agent, injecting a liquid agent, and mixing processing targets are examples of works.

In the present embodiment, the operation control part 1001 operates the robot 3 based on the protocol chart (C) in which multiple works are described. The protocol chart (C) may be stored in advance in the data storage part 1000, or may be input on the spot from the operation part (1d). Based on the protocol chart (C), the operation control part 1001 generates the sequence data (D) that shows an overall processing flow. In the present embodiment, the protocol maker describes codes for generating the sequence data (D) from an arrangement order of the initial symbol 100, the final symbol 101, the sequence line 103, and the processing symbol 104 in the protocol chart (C) and from their contents. The operation control part 1001 executes the codes, interprets the contents of the protocol chart (C), and generates the sequence data (D).

The operation control part 1001 generates unit jobs based on the command definition database (DB1) and the sequence data (D). The operation control part 1001 refers to the command definition database (DB1) and generates unit jobs corresponding to the protocols shown in sequence data (D). The operation control part 1001 arranges and records the unit jobs in the data storage part 1000 so as to achieve a processing order as shown in the sequence data (D). In the present embodiment, only protocols having a job conversion flag of "1" in the sequence data (D) are converted to final jobs.

The operation control part 1001 calculates a state change of a container when a protocol shown in the sequence data (D) is executed, and generates state information. The state information is stored in the state information database (DB2). A method for calculating a state change of a container is defined in the protocol maker or other programs. Based on the unit jobs and the state information, the operation control part 1001 generates connecting jobs so as to connect positions between the unit jobs, and records the connecting jobs in the data storage part 1000. The operation control part 1001 generates robot operation commands so that the unit jobs and the connecting jobs are executed in a chronological order. The operation control part 1001 transmits the generated robot operation commands to the robot controller 2.

3-3. First Request Part

The first request part 1002 is mainly realized by the CPU (1a). The first request part 1002 requests the user to return the robot 3 to the origin. Returning the robot 3 to the origin corresponds to putting the robot 3 in a basic state. Therefore, in the present embodiment, a part describing a process of returning the robot 3 to the origin can be read as a process of putting the robot 3 in the basic state. The basic state may be a predetermined state and is not limited to returning to the origin. Returning to the origin means moving to an origin of coordinate axes set in the robot 3. However, it is also possible that moving the robot 3 to a predetermined position other than the origin corresponds to the basic state. The basic state does not have to be a physical position (posture) of the robot 3, but, for example, may be a state in which internal information such as a parameter or a variable of the robot 3 is set to a predetermined state.

The first request part 1002 uses a visual or auditory device to request the user to return the robot 3 to the origin. For example, when the robot 3 stops operating, the first request part 1002 displays in the display part (1e) a message prompting the user to return the robot 3 to the origin. Further, for example, when the robot 3 stops operating, the first request part 1002 outputs from a speaker a voice prompting the user to return the robot 3 to the origin. The request by the first request part 1002 may be performed by any devices, and is not limited to these examples. For example, the first request part 1002 may perform the request that the robot 3 be returned to the origin on the reproduction screen (G).

3-4. State Control Part

The state control part 1003 is mainly realized by the CPU (1a). When the robot 3 stops during processing, the state control part 1003 returns the robot 3 to the origin. In the present embodiment, when it is requested that the robot 3 be returned to the origin, the state control part 1003 returns the robot 3 to the origin according to an instruction of the user. After the request by the first request part 1002 is performed, the state control part 1003 returns the robot 3 to the origin on a condition that an instruction of the user is input. This instruction may be given by a predetermined operation for returning the robot 3 to the origin.

The state control part 1003 transmits to the robot controller 2 a robot operation command for returning the robot 3 to the origin. This command may be in a predetermined form, and, for example, may include information indicating the basic posture of the robot 3. When the robot controller 2 stores information about the basic posture, the command does not have to include this information. Upon receiving the robot operation command, the robot controller 2 causes the robot 3 to return to the origin. The robot controller 2 controls outputs to motors inside the robot 3 to rotate the motors so that the robot 3 moves to the origin.

It is also possible that the request by first request part 1002 is not particularly performed, and the state control part 1003 returns the robot 3 to the origin according to an instruction of the user. Further, it is also possible that the state control part 1003 automatically returns the robot 3 to the origin without any operation by the user. In this case, the state control part 1003 returns the robot 3 to the origin when a predetermined condition is satisfied. This condition may be any condition, for example, it may be that a certain period of time has passed since the robot 3 stopped, or that an object gripped by the robot 3 is removed.

3-5. Display Control Part

The display control part 1004 is mainly realized by the CPU (1a). The display control part 1004 displays a work stopped during processing in an identifiable manner on a screen showing identification information of each of multiple works. Identification information may be any information that can identify a work, for example, a name or ID of the work. On this screen, identification information of each work is displayed in a chronological order. In the present embodiment, the protocol chart (C) corresponds to this screen, and a protocol name in the protocol chart (C) corresponds to identification information. Therefore, in the present embodiment, a part describing the protocol chart (C) can be read as the above screen, and a part describing a protocol name can be read as identification information. The above screen may be in any form, and may not be in a chart form. For example, the above screen may be in a table form, or in a block diagram form.

A work stopped during processing is a work that was being performed by the robot 3 when the robot 3 stopped. In the present embodiment, a protocol when the robot 3 stopped corresponds to a work stopped during processing. Therefore, a part describing a protocol when the robot 3 stopped can be read as a work stopped during processing. It is also possible that a work stopped during processing is identified by something other than a protocol, for example, a work name different from a protocol name, or a name of a command. In addition, for example, each detailed work included in a protocol may correspond to a work stopped during processing.

For example, the display control part 1004 displays, in the protocol chart (C), in an identifiable manner, a name of a protocol stopped by the robot 3 during processing. As illustrated in FIG. 7, in the present embodiment, the display control part 1004 highlights the name of the protocol stopped by the robot 3 during processing. The highlighting is a display mode allowing distinction from other protocol names. For example, as illustrated in FIG. 7, the display control part 1004 highlights the name of the protocol stopped by the robot 3 during processing by enclosing the name of the protocol with a line. The highlighting may be performed in any display mode. For example, the protocol name may be blinked, a color of the protocol name may be changed, or a size of the protocol name may be increased.

3-6. Receiving Part

The receiving part 1005 is mainly realized by the CPU (1*a*). When the robot 3 that sequentially performs multiple works stops during processing, the receiving part 1005 receives a specification of a resume work to be resumed by the robot 3. In the present embodiment, specifying a resume protocol from the protocol chart (C) corresponds to specifying a resume work. Therefore, a part describing a specification of a resume protocol from the protocol chart (C) can be read as a specification of a resume work. In the present embodiment, the receiving part 1005 receives a specification of identification information displayed on a screen. A resume work can be specified in any manner. For example, a resume work may be specified by directly inputting identification information of a work. In addition, for example, a resume work may be specified by specifying a detailed work included in a protocol.

For example, the receiving part 1005 can receive a specification of a work different from the work stopped during processing by the robot 3 as a resume work. The different work is a work before the work stopped during processing by the robot 3, or a work after the work stopped during processing by the robot 3. For example, the receiving part 1005 may receive a specification of a work immediately before the stopped work, or may receive a specification of a work before the work immediately before the stopped work. Further, for example, the receiving part 1005 may receive a specification of a work immediately after the stopped work, or may receive a specification of a work after the work immediately after the stopped work. The receiving part 1005 may receive a specification of a work same as the work stopped during processing by the robot 3 as a resume work. The user can specify any work.

3-7. First Acquisition Part

The first acquisition part 1006 is mainly realized by the CPU (1*a*). The first acquisition part 1006 acquires a current state of the robot 3. In the present embodiment, since returning the robot 3 to the origin is defined as a restoration process, the first acquisition part 1006 acquires the state of having returned to the origin as the current state. The state of having returned to the origin is information about the position (posture) of the robot 3 when the robot 3 is returned to the origin. In the present embodiment, this information is stored in the data storage part 1000 in advance, and the first acquisition part 1006 refers to the data storage part 1000 to acquire the position of the robot.

It is also possible that the first acquisition part 1006 acquires, from the robot controller 2, the information about the position of the robot 3 when the robot 3 is returned to the origin. The first acquisition part 1006 transmits to the robot controller 2 a detection request about the position of the robot 3. Upon receiving the detection request, the robot controller 2 acquires information about the position of the robot 3 based on a detection signal of a sensor that detects the position of the robot 3 and transmits the information to the command generating device 1. The first acquisition part 1006 receives the information transmitted from the robot controller 2. When the robot 3 is not returned to the origin, the first acquisition part 1006 may acquire information about the current position of the robot 3 from the robot controller 2 in the same manner as described above. For example, the first acquisition part 1006 may acquire information about the current position of the robot manually adjusted by the user.

3-8. Second Acquisition Part

The second acquisition part 1007 is mainly realized by the CPU (1*a*). The second acquisition part 1007 acquires a resume state corresponding to a resume work of the robot 3. The resume state is the state of the robot 3 when the robot 3 performs a resume work. In the present embodiment, the start position of the unit job of the protocol specified by the user as the resume work corresponds to the resume state. Therefore, in the present embodiment, a part describing the start position can be read as the resume state. Since the start position is included in the unit job, the second acquisition part 1007 acquires the resume state by acquiring the start position included in the unit job. The resume state may be information other than the position of the robot 3. For example, the resume state may be an object gripped by the robot 3.

When a job of a continuation protocol is generated by the operation control part 1001 or the resume part 1010, since a state change of a container when a protocol having an initial state reflection flag of "1" is executed is calculated, the second acquisition part 1007 may acquire a resume state based on a result of the calculation. For example, the second acquisition part 1007 may acquire as a resume state a state of a container (a state of a container at the time of resuming) when a protocol having an initial state reflection flag of "1" is executed to the end. Further, for example, the second acquisition part 1007 may refer to the state information database (DB2) and acquire state information immediately before a resume protocol as a resume state.

3-9. Third Acquisition Part

The third acquisition part 1008 is mainly realized by the CPU (1*a*). The third acquisition part 1008 acquires a surrounding environment of the robot 3 corresponding to a resume work. A surrounding environment is a state of device other than the robot 3, for example, a state of the tube rack (5*a*), the main rack (5*b*), the centrifugal separator 6, the pipette 7, the pipette rack 8, the thermostatic bath 9, the vortex mixer 10, or the dust box 11. A surrounding environment corresponding to a resume work may be stored in the state information database (DB2). In the present embodiment, when a job of a continuation protocol is generated by the operation control part 1001 or the resume part 1010, since a state at the time of resuming is calculated, the third acquisition part 1008 may acquire a state of a surrounding environment from a result of the calculation.

3-10. Second Request Part

The second request part 1009 is mainly realized by the CPU (1a). The second request part 1009 requests the user to create a surrounding environment corresponding to a resume work. The second request part 1009 uses a visual or auditory devices to request the user to create a surrounding environment corresponding to a resume work. For example, the second request part 1009 causes the display part (1e) to display a device arrangement of the robot 3 at the time of resuming. Further, for example, the second request part 1009 outputs from a speaker a voice prompting to create a surrounding environment corresponding to a resume work. In the present embodiment, the second request part 1009 performs a request by displaying the reproduction screen (G) on the display part (1e). The request by the second request part 1009 may be performed by any devices, and is not limited to these examples.

3-11. Resume Part

The resume part 1010 is mainly realized by the CPU (1a). The resume part 1010 causes the robot 3 to operate from a current state to a resume state, and causes the robot 3 to resume from the resume state. In the present embodiment, since the robot 3 is returned to the origin, the resume part 1010 causes the robot 3 to operate from the state of having returned to the origin to a resume state, and causes the robot 3 to resume from the resume state. When the robot 3 is not returned to the origin, the resume part 1010 causes the robot 3 to operate from a state acquired by the first acquisition part 1006 to a resume state. The resume part 1010 transmits to the robot controller 2 a robot operation command for causing the robot 3 to operate from a current state to a resume state, and a robot operation command for causing the robot 3 to resume from a resume work.

The resume part 1010 causes the robot 3 to resume from a resume work based on a connecting job for putting the robot 3 from a state of having returned to the origin to a resume state. The connecting job may be generated by the operation control part 1001, or by the resume part 1010. A method for generating a connecting job is as described above. A job is generated so that the robot 3 moves along a predetermined route from the position of the origin of the robot to the start position of the unit job of the protocol to be resumed. When it is necessary to grip a container or tool up to a resume work, a connecting job for gripping the container or tool is generated. For example, the resume part 1010 generates unit jobs and connecting jobs of a continuation protocol according to the above-described flow. The resume part 1010 generates robot operation commands based on these jobs, and transmits the generated robot operation commands to the robot controller 2.

For example, the resume part 1010 may virtually execute works from a first work to a work before a resume work, and may cause the robot 3 to operate from a current state to a resume state and cause the robot 3 to resume from the resume work. Virtual execution means an execution only inside a computer, and that the robot 3 is not caused to physically operate. In the present embodiment, since a job is not generated for a protocol having a job conversion flag of "0," the resume part 1010 virtually executes a protocol having a job conversion flag of "0." Virtual execution of a protocol may be performed by the operation control part 1001.

In the present embodiment, since the protocol chart (C) is used, the resume part 1010 causes the robot 3 to resume from a resume work based on the protocol chart (C). The resume part 1010 transmits robot operation commands generated based on the protocol chart (C) to the robot controller 2 and causes the robot 3 to resume from a resume work. The resume part 1010 causes the robot 3, which has resumed from the resume work, to manufacture a target object. The target object can be any object, for example, a final processing target. A processing target that has been subjected to centrifugal separation or processing target that has been subjected to mixing with a liquid agent is an example of a manufactured target object. In a case of an industrial robot, a workpiece or a final product is an example of a manufactured target object.

4. PROCESSING EXECUTED BY ROBOT SYSTEM

Figure 12:
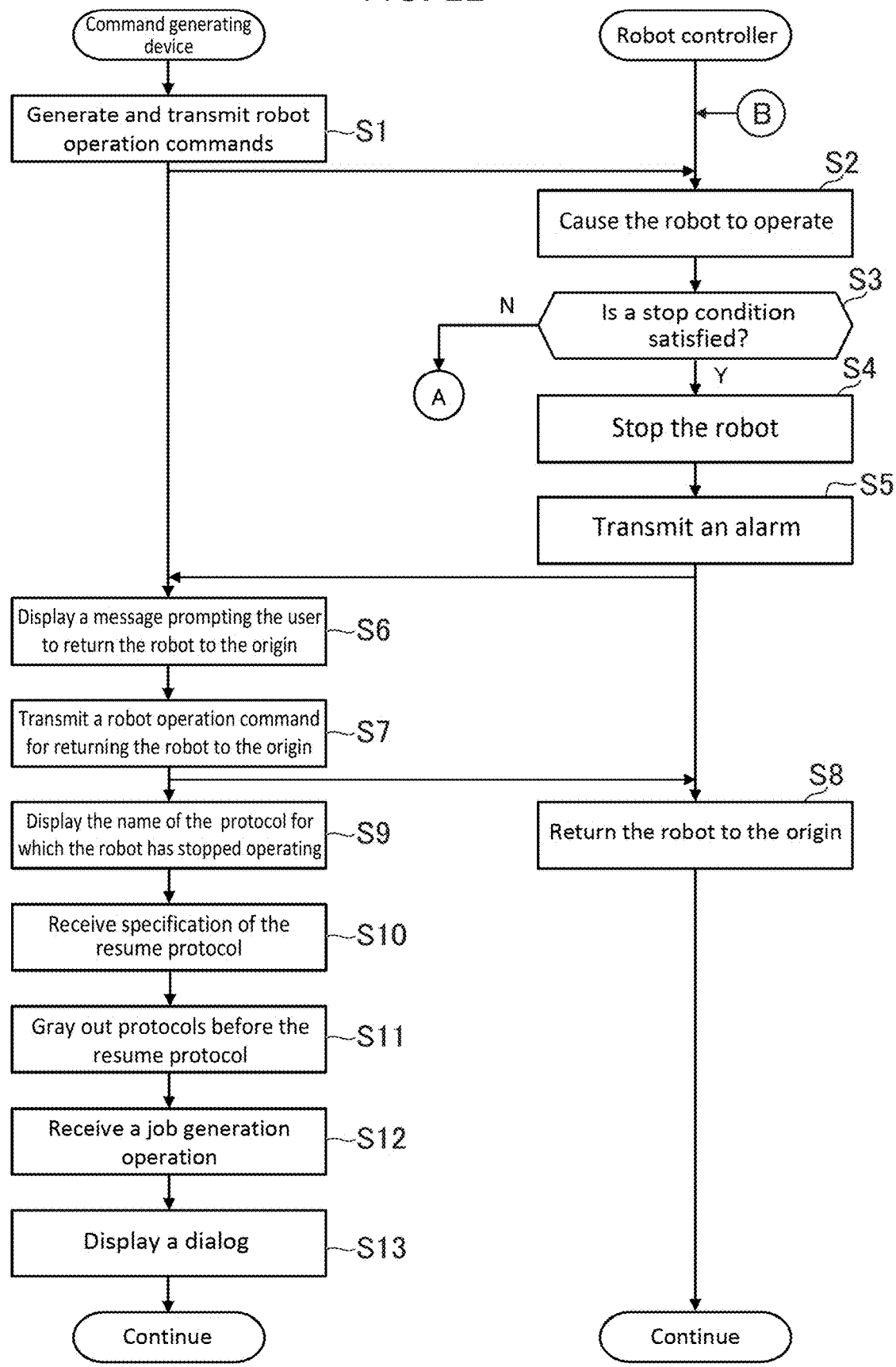
FIG. 12 is a flow diagram illustrating an example of processing executed by the robot system when the robot stops operating.
Figure 13:
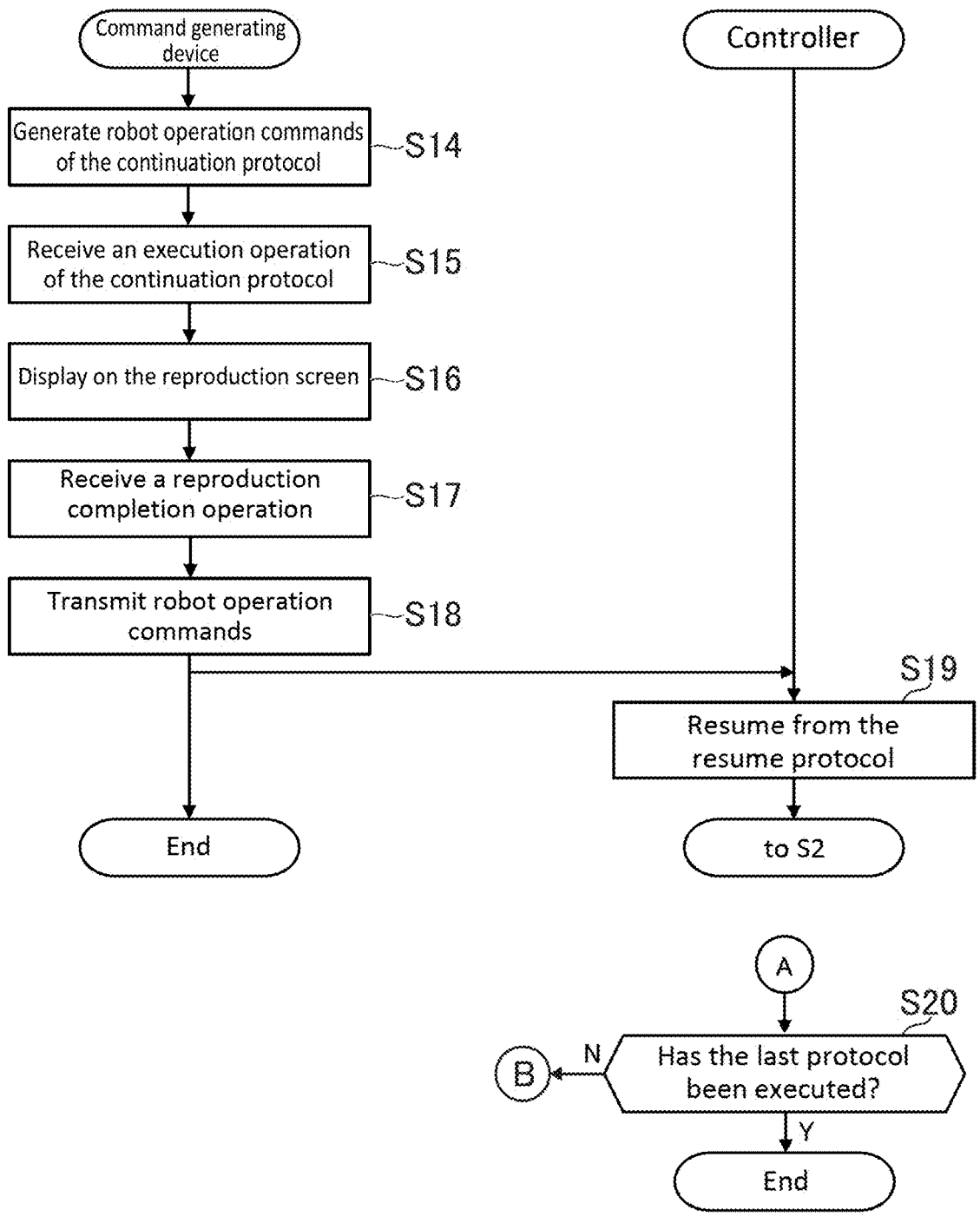
FIG. 13 is a flow diagram illustrating an example of processing executed by the robot system when the robot stops operating.

FIGS. 12 and 13 are flow diagrams illustrating an example of processing executed by the robot system (S) when the robot 3 stops operating. The processing illustrated in FIGS. 12 and 13 is an example of processing executed by the functional blocks illustrated in FIG. 11.

As illustrated in FIG. 12, the command generating device 1 generates robot operation commands based on the protocol chart (C) and transmits the robot operation commands to the robot controller 2 (S1). In S1, the command generating device 1 generates the sequence data (D) based on the protocol chart (C). The command generating device 1 generates unit jobs corresponding to protocols shown in the sequence data (D) based on the command definition database (DB1). The command generating device 1 generates state information corresponding to the generated unit jobs and stores the state information in the state information database (DB2). The command generating device 1 generates connecting jobs between the unit jobs based on the contents of the state information. The command generating device 1 generates robot operation commands such that the unit jobs and the connecting jobs are sequentially executed, and transmits the robot operation commands to the robot controller 2.

The robot controller 2 receives the robot operation commands and causes the robot 3 to operate (S2). Since the robot operation commands are generated such that the protocols described in the protocol chart (C) are sequentially executed, in S2, the robot controller 2 causes the robot 3 to operate such that the protocols are executed in the order described in the protocol chart (C).

The robot controller 2 determines whether or not a predetermined stop condition is satisfied (S3). The stop condition is a condition for causing the robot 3 to stop, for example, that the robot 3 interferes with another object, or, that the robot 3 drops an object gripped by the robot 3. In S3, the robot controller 2 determines whether or not the stop condition is satisfied based on detection signals of sensors such as motion sensors and vision sensors. Satisfaction of the stop condition may be determined based on internal information such as a variable.

When it is determined that the stop condition is satisfied (S3; Y), the robot controller 2 causes the robot 3 to stop (S4) and transmits a predetermined alarm to the command generating device 1 (S5). The alarm is performed by transmitting data in a predetermined format, for example, containing information that allows the protocol for which the robot 3 has stopped operating to be identified. For example, a name of a robot operation command that was being executed when the robot 3 stopped is included in the alarm as this information.

The command generating device 1 receives the alarm and displays in the display part (1e) a message prompting the user to return the robot 3 to the origin (S6). Upon confirming this message, the user removes a part or the like gripped by the robot 3 and performs an operation to return the robot 3 to the origin. Based on an operation of the user, the command generating device 1 transmits to the robot controller 2 a robot operation command for returning the robot 3 to the origin (S7). This robot operation command includes a position of the robot 3 when the robot 3 is returned to the origin (a position of the origin in a coordinate system set in the robot 3).

Upon receiving the robot operation command, the robot controller 2 causes the robot 3 to return to the origin (S8). In S8, the robot controller 2 controls the robot 3 such that the robot 3 moves to the position included in the robot operation command. After that, the user takes a corrective action for a problem around the robot 3.

The command generating device 1 starts the protocol maker, and displays on the protocol chart (C) a name of a protocol for which the robot 3 has stopped operating (S9). In S9, the command generating device 1 highlights in the protocol chart (C) a processing symbol 104 of a protocol identified by the received alarm.

The command generating device 1 receives, based on a detection signal of the operation part (1*d*), a specification of a resume protocol by the user (S10), and grays out protocols before the resume protocol specified by the user in the protocol chart (C) (S11). In S10, the user specifies the resume protocol by selecting any processing symbol 104 displayed in the protocol chart (C). In S11, the command generating device 1 grays out a portion before the processing symbol 104 selected by the user.

The command generating device 1 receives, based on a detection signal of the operation part (1*d*), a job generation operation by the user (S12), and the command generating device 1 displays a dialog in the protocol chart (C) (S13). Moving on to FIG. 13, the command generating device 1 generates robot operation commands of a continuation protocol based on an operation of the user with respect to the dialog (S14). In S14, the command generating device 1 generates sequence data (D) in which the initial state flag is set to "1" and the job conversion flag is set to "0" for protocols up to a protocol before the resume protocol specified by the user. Based on the sequence data (D), the command generating device 1 generates unit jobs, connecting jobs, and state information, and generates robot operation commands.

The command generating device 1 receives, based on a detection signal of the operation part (1*d*), an execution operation of the continuation protocol by the user (S15), and the command generating device 1 displays a state at the time of resuming on the reproduction screen (G) in the protocol chart (C) (S16). In S16, the command generating device 1 displays the reproduction screen (G) based on state information generated in a process of generating the robot operation commands. The user follows a guidance displayed on the reproduction screen (G) to reproduce an environment around the robot 3 in a state immediately before resuming.

The command generating device 1 receives, based on a detection signal of the operation part (1*d*), a reproduction completion operation by the user (S17), and transmits robot operation commands to the robot controller 2 (S18). Upon receiving the robot operation commands, the robot controller 2 resumes from the resume protocol specified by the user (S19), and returns to the processing of S2 and continues control based on the received robot operation commands. In S19, the robot controller 2 moves the robot 3 from the state of having returned to the origin to the start position of the resume protocol. When the robot 3 is moved to the start position of the resume protocol, the robot controller 2 controls the robot 3 to start the resume protocol. The robot controller 2 executes these controls based on the robot operation commands received in S19.

In S3, when it is not determined that the stop condition is satisfied (S3; N), the robot controller 2 determines whether or not the last protocol has been executed (S20). When it is not determined that the last protocol has been executed (S20; N), the processing returns to S2 and the control based on the robot operation command is continued. When it is determined that the last protocol has been executed (S20; Y), the process ends.

According to the robot system (S) described above, when the robot 3 stops during processing, the robot 3 can be caused to resume from any resume protocol by receiving a specification of the resume protocol for causing the robot 3 to resume and moving the robot 3 from a current state to a resume state corresponding to the resume protocol. For example, in a case of returning the stopped robot 3 to the initial state and causing the robot 3 to resume from the first work, since works have to be done over again from the first work, it is inefficient. However, according to the robot system (S), since it is possible to resume from any work, protocols from the first protocol to the protocol immediately before the resume protocol can be skipped, and work efficiency after resuming can be improved. Further, for example, in a case of resuming from a continuation of a work at the time of stopping, since it is necessary to return the robot 3 to the state at the time of stopping and then causes the robot 3 to resume, the resume work becomes complicated. However, according to the robot system (S), since it is possible to smoothly resume from any state, a burden of the resume work can be reduced. Further, by smoothly resuming, it is also possible to shorten the time until resuming.

Further, in the robot system (S), when the robot 3 stops during processing, the robot 3 is returned to the origin, the robot 3 is moved from the state of having been returned to the origin to a state corresponding to a resume protocol, and, the robot 3 is caused to resume from the resume protocol. Thereby, no matter which resume protocol the robot 3 resumes from, the same basic state is a reference, and thus, the work can be more smoothly resumed. Further, since the state as a reference is the same, a mechanism for shifting to a state corresponding to a resume protocol can be simplified.

Further, the robot system (S) can support a restoration operation of the user by requesting the user to return the robot 3 to the origin and causing the robot 3 to return to the origin according to an instruction of the user.

Further, the robot system (S) can cause the robot 3 to resume from any resume protocol by being able to receive a specification of a protocol, as a resume protocol, different from the protocol for which the robot 3 stopped during processing. For example, it is possible that the user performs a continuation of a protocol stopped during processing and the robot 3 resumes from the next protocol. Further, for example, it is possible that the user returns the robot 3 to a state immediately before the protocol stopped during processing and the robot 3 resumes from a protocol immediately before the protocol stopped during processing.

Further, the robot system (S) facilitates specification of a resume work by displaying a screen that allows a protocol stopped during processing to be identified and receiving a specification of a resume protocol in the screen.

Further, the robot system (S) can support a restoration operation of the user by requesting the user to create a surrounding environment corresponding the resume protocol.

Further, the robot system (S) can cause the robot 3 to smoothly resume by virtually executing from the first protocol to the protocol before the resume protocol, causing the robot 3 to operate from a current state to a resume state, and causing the robot 3 to resume from the resume protocol. For example, even for a program that needs to be executed from the beginning, it is possible to resume from any protocol.

Further, based on the protocol chart (C) in which multiple protocols are described, the robot system (S) can cause the robot 3 to more smoothly resume from the resume protocol by causing the robot 3 to resume from the resume protocol.

5. MODIFIED EMBODIMENTS

The present invention is not limited to the embodiment described above. Appropriate modifications are possible within a scope without departing from the spirit of the present invention.

Figure 14:
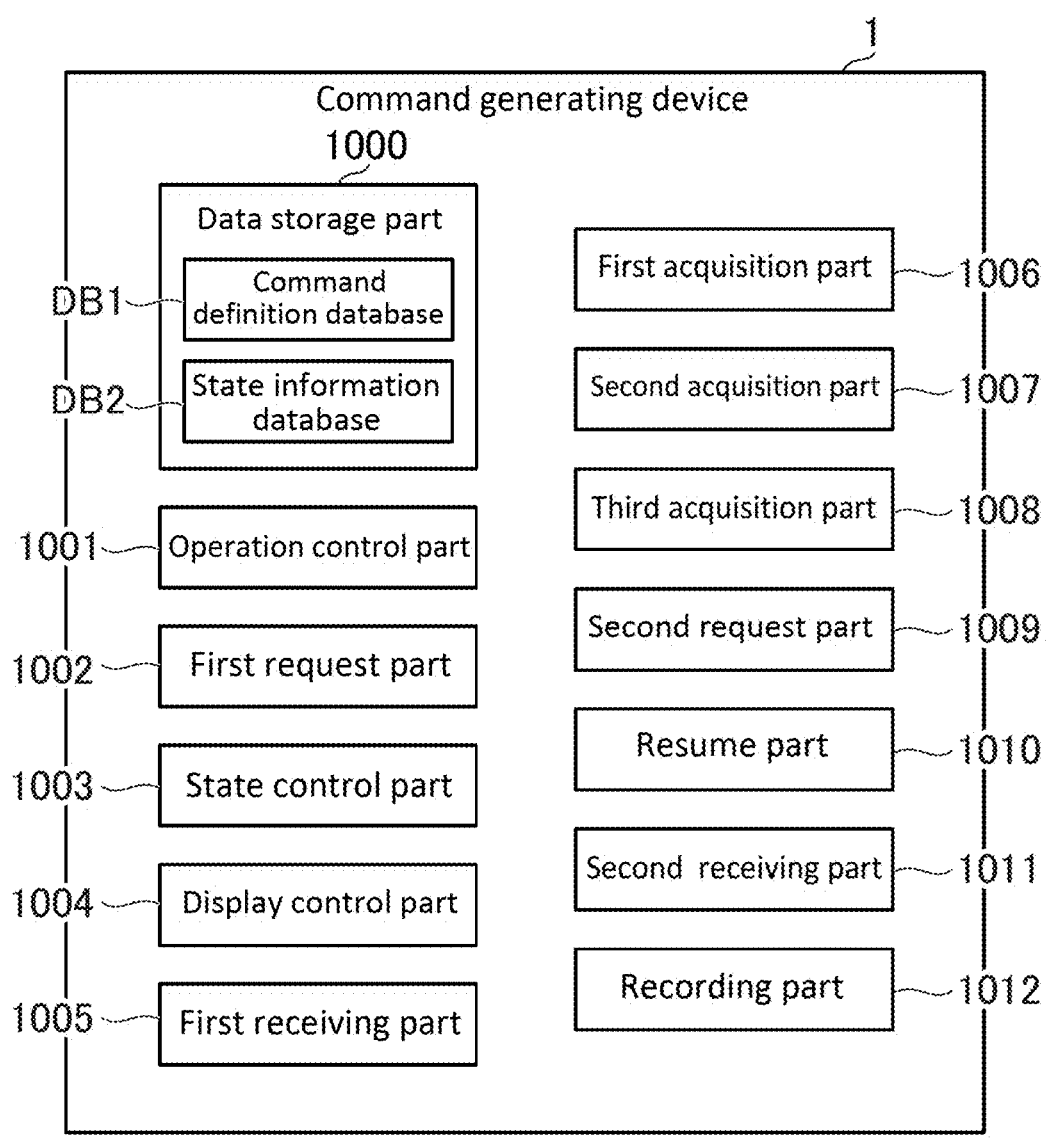
FIG. 14 is a functional block diagram of a modified embodiment.

FIG. 14 is a functional block diagram of a modified embodiment. As illustrated in FIG. 14, in the modified embodiments described below, in addition to the functions described in the embodiment, a second receiving part 1011 and a recording part 1012 are realized. In FIG. 14, the receiving part 1005 described in the embodiment is described as a first receiving part 1005.

(1) For example, not only a resume protocol but also a resume condition at the time of resuming the resume protocol may be specified by the user. As a resume operation, any condition can be specified. For example, a resume condition is a state of a container at the time of resuming, a state of a part used by the robot 3, a position of the robot 3, a waiting time for the robot 3 to wait for operation, an operation time of peripheral equipment, or a state of peripheral equipment. In addition, for example, when a parameter of the robot controller 2 can be specified from the command generating device 1, the parameter after resuming the resume protocol may correspond to a resume condition.

In the present modified embodiment, the second receiving part 1011 is realized. The second receiving part 1011 is mainly realized by the CPU (1*a*). The second receiving part 1011 receives a specification of a resume condition of the resume work. The second receiving part 1011 receives a specification of a resume condition based on a detection signal of the operation part (1*d*). For example, the second receiving part 1011 receives, as a resume operation specified by the user, a state of a container at the time of resuming, a state of a part used by the robot 3, a position of the robot 3, a waiting time for the robot 3 to wait for operation, an operation time of peripheral equipment, or a state of peripheral equipment.

The resume part 1010 causes the robot 3 to resume from a resume work based on a resume condition. The resume part 1010 generates a robot operation command after resuming based on a resume condition and transmits the robot operation command to the robot controller 2. For example, the resume part 1010 generates a robot operation command for changing a container to a state specified by the user (for example, a command for moving or gripping a container). Further, for example, the resume part 1010 generates a robot operation command for changing a part to a state specified by the user (for example, a command for moving or gripping a part). For other resume conditions, similarly, the resume part 1010 may generate robot operation commands corresponding to the resume conditions.

According to the modified embodiment (1), it is possible to smoothly resume from a resume protocol by receiving a specification of a resume condition for resuming the resume protocol and causing the robot 3 to resume from the resume protocol based on the resume condition.

(2) Further, for example, it is possible that, in the modified example (1), a resume condition specified by the user is recorded in the data storage part 1000, and, when the same protocol is specified again, the recorded resume condition is read out and the protocol is executed. That is, when the same failure occurs, the resume protocol corresponding to the resume condition may be executed without the user specifying the resume condition again.

In the present modified embodiment, the recording part 1012 is realized. The recording part 1012 is mainly realized by the CPU (1*a*). The recording part 1012 records a resume protocol and a resume condition in association with each other in the data storage part 1000. The recording part 1012 records a resume protocol and a resume condition specified by the user in association with each other in the data storage part 1000. The storage part 112 may record the entire continuation protocol including the resume protocol and protocols after the resume protocol.

When the robot 3 stops during processing again and a recorded resume protocol is specified, the resume part 1010 causes the robot 3 to resume from the resume protocol based on the resume condition stored in association with the resume protocol. In this case, the resume part 1010 causes the robot 3 to resume from the resume protocol based on the resume condition stored in data storage part 1000 without the user specifying the resume condition. A resume method itself corresponding to the resume condition is as described in the modified embodiment (1).

According to the modified embodiment (2), a resume protocol and a resume condition are recorded in association with each other, and, when the resume protocol is specified, the robot 3 is caused to resume from a resume work based on the resume condition stored in association with the resume protocol, and thereby, a restoration operation of the user can be supported.

(3) For example, when a resume protocol includes a loop operation that is repeatedly executed, a resume condition may be a loop at the time of resuming. In this case, in the resume protocol, an operation is defined such that a predetermined operation is repeatedly executed. The number of loops of the operation in the resume protocol is predetermined. As the number of loops of the resume condition, a number that is 1 or larger and is smaller than or equal to a maximum number of loops is specified. The resume part 1010 generates a robot operation command to resume the resume protocol from the number of loops specified by the user. This robot operation command is a command for repeating an operation for the remaining number of loops. The robot controller 2 causes the robot 3 to operate such that the operation is repeated for the remaining number of loops indicated in the robot operation command.

According to the modified embodiment (3), a work can be more accurately resumed by including the loop at the time of resuming as the resume condition.

(4) Further, for example, the above-described modified embodiments may be combined.

Further, for example, the case is described where the command generating device 1 generates robot operation commands based on the protocol chart (C). However, the robot 3 can be controlled using any other method. For example, the robot controller 2 may control the robot 3 based on a program written in a robot language or a ladder language. In this case, the user specifies any code in the program as a resume work. When the robot 3 is returned to the origin, the command generating device 1 generates a robot operation command for causing the robot to operate from the state of having returned to the origin to a state immediately before the code specified by the user. Based on this robot operation command, the robot controller 2 may cause the robot 3 to operate to a state immediately before the code specified by the user, and execute commands after this code.

Further, for example, the functions described above may each be realized by any device in the robot system (S). For example, a function described as being realized by the command generating device 1 may be realized by the robot controller 2 or another computer. Further, for example, it is also possible that the functions are not realized by a single computer, but the realization of the functions is shared by multiple computers.

Further, the above-described embodiments are illustrated as specific examples. The invention described in the present specification is not limited to the structures or data storage examples of these specific examples. These embodiments may be modified in various ways, such as changing shapes or numbers of physical structures, data structures, and an execution order of processing. The technical scope of invention described in the specification also includes such modifications.

A problem to be solved by one aspect of the present invention is, for example, to cause a device that sequentially executes multiple works to resume from any work. When a device stops due to some failure during an operation, it is necessary for a user to restore from the failure, return the device to an initial state, and cause the device to resume from a first work. It is necessary for the device to also execute unnecessary works, and works after resuming are inefficient.

A device according to an embodiment of the present invention sequentially executes multiple works and can resume from any work.

A work resume system according to one aspect of the present invention includes: a receiving part that receives a specification of a resume work to be resumed by a device when the device, which sequentially performs multiple works, stops during processing; a first acquisition part that acquires a current state of the device; a second acquisition part that acquires a resume state corresponding to the resume work of the device; and a resume part that causes the device to operate from the current state to the resume state and causes the device to resume from the resume work.

A manufacturing method according to another aspect of the present invention includes: receiving a specification of a resume work to be resumed by a device when the device, which sequentially performs multiple works, stops during processing; acquiring a current state of the device; acquiring a resume state corresponding to the resume work of the device; causing the device to operate from the current state to the resume state and causing the device to resume from the resume work; and causing the device that has been resumed from the resume work to manufacture a target object.

A program according to yet another aspect of the present invention causes a computer to function as: a receiving part that receives a specification of a resume work to be resumed by a device when the device, which sequentially performs multiple works, stops during processing; a first acquisition part that acquires a current state of the device; a second acquisition part that acquires a resume state corresponding to the resume work of the device; and a resume part that causes the device to operate from the current state to the resume state and causes the device to resume from the resume work.

According to still another aspect of the present invention, the work resume system further includes a state control part that puts the device in a basic state when the device stops during processing. The first acquisition part acquires the basic state as the current state, and the resume part causes the device to operate from the basic state to the resume state and causes the device to resume from the resume work.

According to still another aspect of the present invention, the work resume system further includes: a first request part that requests a user to put the device in the basic state; and a state control part that puts the device in the basic state according to an instruction of the user when it is requested to put the device in the basic state.

According to still another aspect of the present invention, the receiving part can receive a specification of a work different from a work stopped during processing by the device as the resume work.

According to still another aspect of the present invention, the work resume system further includes: a display control part that displays a work stopped during processing in an identifiable manner on a screen showing identification information of each of the multiple works. The receiving part receives a specification of the identification information displayed on the screen.

According to still another aspect of the present invention, the work resume system further includes: a third acquisition part that acquires a surrounding environment of the device corresponding to the resume work; and a second request part that requests a user to create the surrounding environment corresponding to the resume work.

According to still another aspect of the present invention, the resume part virtually executes works from a first work to a work before the resume work, and causes the device to operate from the current state to the resume state and causes the device to resume from the resume work.

According to still another aspect of the present invention, the work resume system further includes: a second receiving part that receives a specification of a resume condition of the resume work. The resume part causes the device to resume from the resume work based on the resume condition.

According to still another aspect of the present invention, the work resume system further includes: a recording part that records the resume work and the resume condition in association with each other in a storage part. When the device stops during processing again and the recorded resume work is specified, the resume part causes the device to resume from the resume work based on the resume condition stored in association with the resume work.

According to still another aspect of the present invention, the resume work includes a loop operation that is repeatedly executed, and the resume condition is a loop at time of resuming.

According to still another aspect of the present invention, the work resume system further includes: an operation control part that causes the device to operate based on a protocol chart in which each of the multiple works is described. The resume part causes the device to resume from the resume work based on the protocol chart.

Obviously, numerous modifications and variations of the present invention are possible in light of the above teachings. It is therefore to be understood that within the scope of the appended claims, the invention may be practiced otherwise than as specifically described herein.

What is claimed is:

1. A task resumption system, comprising:
processing circuitry configured to
put a device, which sequentially performs multiple tasks, in a basic state when the device stops during processing, by causing the device to return to an initial configuration of the device, the initial configuration of the device including a predetermined posture of the device,
receive a task resumption specification for task resumption by the device when the device stops during processing,
acquire a current state of the device,
acquire a resume state corresponding to the task resumption of the device,
cause the device to transition from the current state to the resume state, and
cause the device to resume the task according to the resume state, wherein the processing circuitry is further configured to
cause the device to operate based on a protocol chart in which one or more processing symbols identifying one or more of the multiple tasks are arranged, and
cause the device to resume the task based on a selection, by a user via the protocol chart, of a processing symbol of the one or more processing symbols associated with the task.

2. The task resumption system according to claim 1, wherein the processing circuitry is further configured to acquire the basic state as the current state, cause the device to transition from the basic state to the resume state, and cause the device to resume the task according to the resume state.

3. The task resumption system according to claim 1, wherein the processing circuitry is further configured to request a user to put the device in the basic state, put the device in the basic state according to an instruction of the user requesting that the device be put into the basic state, acquire the basic state as the current state, cause the device to transition from the basic state to the resume state, and cause the device to resume the task according to the resume state.

4. The task resumption system according to claim 1, wherein the processing circuitry is further configured to receive a specification for a second task different from the task being performed by the device when the processing was stopped as the second task to be performed after resumption.

5. The task resumption system according to claim 1, wherein the processing circuitry is further configured to control a display to display the task being performed when processing was stopped in an identifiable manner on a screen of the display showing identification information of multiple tasks, and receive a specification of the identification information displayed on the screen of the display.

6. The task resumption system according to claim 5, wherein the processing circuitry is further configured to request a user to create a surrounding environment of the device when resuming the task.

7. The task resumption system according to claim 1, wherein the processing circuitry is further configured to virtually execute a task before the task resumption.

8. The task resumption system according to claim 1, wherein the processing circuitry is further configured to receive a specification of a resume condition for the task resumption, and cause the device to resume the task based on the resume condition.

9. The task resumption system according to claim 8, wherein the processing circuitry is further configured to record the resumed task and the resume condition in association with each other in a storage, and when the device stops again during processing and the recorded task is specified, cause the device to resume work based on the resume condition stored in association with the resumed task.

10. The task resumption system according to claim 8, wherein the resumed task includes a loop operation that is repeatedly executed, and the resume condition is a loop being executed at time of resuming.

11. A method for task resumption, comprising:
putting a device, which sequentially performs multiple tasks, in a basic state when the device stops during processing, by causing the device to return to an initial configuration of the device, the initial configuration of the device including a predetermined posture of the device;
receiving a task resumption specification by the device when the device stops during processing;
acquiring a current state of the device;
acquiring a resume state corresponding to a task resumption of the device;
causing the device to transition from the current state to the resume state; and
causing the device to resume the task according to the resume state, wherein
the method further comprises
causing the device to operate based on a protocol chart in which one or more processing symbols identifying one or more of the multiple tasks are arranged; and
causing the device to resume the task based on a selection, by a user via the protocol chart, of a processing symbol of the one or more processing symbols associated with the task.

12. The method according to claim 11, further comprising:
causing the device that has resumed the task to manufacture a target object.

13. A non-transitory computer readable medium having stored thereon a program that when executed by a computer causes the computer to implement a method for task resumption, comprising:
putting a device, which sequentially performs multiple tasks, in a basic state when the device stops during processing, by causing the device to return to an initial configuration of the device, the initial configuration of the device including a predetermined posture of the device;
receiving a task resumption specification for task resumption by the device when the device stops during processing;
acquiring a current state of the device;
acquiring a resume state corresponding to the task resumption of the device;
causing the device to transition from the current state to the resume state; and
causing the device to resume the task according to the resume state, wherein the method further comprises
causing the device to operate based on a protocol chart in which one or more processing symbols identifying one or more of the multiple tasks are arranged; and causing the device to resume the task based on a selection, by a user via the protocol chart, of a processing symbol of the one or more processing symbols associated with the task.

14. The task resumption system according to claim 2, wherein the processing circuitry is further configured to receive a specification for a second task different from the task being performed by the device when the processing was stopped as the second task to be performed after resumption.

15. The task resumption system according to claim 2, wherein the processing circuitry is further configured to control a display to display the task being performed when processing was stopped in an identifiable manner on a screen of the display showing identification information of multiple tasks, and receive a specification of the identification information displayed on the screen of the display.

16. The task resumption system according to claim 3, wherein the processing circuitry is further configured to control a display to display the task being performed when processing was stopped in an identifiable manner on a screen of the display showing identification information of multiple tasks, and receive a specification of the identification information displayed on the screen of the display.

17. The task resumption system according to claim 4, wherein the processing circuitry is further configured to control a display to display the task being performed when processing was stopped in an identifiable manner on a screen of the display showing identification information of multiple tasks, and receive a specification of the identification information displayed on the screen of the display.

18. The task resumption system according to claim 1, wherein the predetermined posture of the device includes an orientation of the device and a particular posture of arms of the device.

19. The task resumption system according to claim 1, wherein the processing circuitry is further configured to
virtually execute a task before the task resumption,
receive a specification of a resume condition for the task resumption, and
cause the device to resume the task based on the resume condition.

20. The task resumption system according to claim 1, wherein
the protocol chart indicates contents of processing with respect to a processing target or a container containing the processing target.

* * * * *